US012634817B2

(12) United States Patent
Zhou et al.

(10) Patent No.: US 12,634,817 B2
(45) Date of Patent: May 19, 2026

(54) DATA SENDING/RECEIVING METHOD, ELECTRONIC DEVICE, AND COMPUTER-READABLE STORAGE MEDIUM

(71) Applicant: Huawei Technologies Co., Ltd., Shenzhen (CN)

(72) Inventors: Ming Zhou, Shanghai (CN); Rong Zou, Shanghai (CN); Zheyan Wu, Shanghai (CN); Shaolong Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 535 days.

(21) Appl. No.: 17/761,070

(22) PCT Filed: Sep. 11, 2020

(86) PCT No.: PCT/CN2020/114668
§ 371 (c)(1),
(2) Date: Mar. 16, 2022

(87) PCT Pub. No.: WO2021/052245
PCT Pub. Date: Mar. 25, 2021

(65) Prior Publication Data
US 2022/0346010 A1 Oct. 27, 2022

(30) Foreign Application Priority Data
Sep. 17, 2019 (CN) .......................... 201910877530.7

(51) Int. Cl.
*H04W 52/02* (2009.01)
*H04W 12/06* (2021.01)

(52) U.S. Cl.
CPC ....... *H04W 52/0216* (2013.01); *H04W 12/06* (2013.01); *H04W 52/0229* (2013.01); *H04W 52/0245* (2013.01); *H04W 52/0274* (2013.01)

(58) Field of Classification Search
CPC ............. H04W 52/0229; H04W 12/06; H04W 52/0216; H04W 52/0245; H04W 52/0274;
(Continued)

(56) References Cited

U.S. PATENT DOCUMENTS

| | | | |
|---|---|---|---|
| 9,622,171 B2 | 4/2017 | Voigt et al. | |
| 2007/0127478 A1 | 6/2007 | Jokela et al. | |

(Continued)

FOREIGN PATENT DOCUMENTS

| | | |
|---|---|---|
| CN | 102695279 A | 9/2012 |
| CN | 103096419 A | 5/2013 |

(Continued)

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Std 802.11—2016, Approved Dec. 7, 2016, 3534 pages.

*Primary Examiner* — Ricky Q Ngo
*Assistant Examiner* — Kabir U Jahangir
(74) *Attorney, Agent, or Firm* — Slater Matsil, LLP

(57) ABSTRACT

This application provides a data sending/receiving method, an electronic device, and a computer-readable storage medium. In this application, a first device may receive, in a wakeup state, first data sent by a second device; after sending of the first data is completed, the first device enters a sleep state after a first duration; the first device wakes up again after a second duration; the first device may receive, in the wakeup state, second data sent by the second device;

(Continued)

and after sending of the second data is completed, the first device enters a sleep mode after a third duration. In this process, the first duration is different from the third duration.

20 Claims, 28 Drawing Sheets

(58) Field of Classification Search
CPC .......... H04W 52/028; H04W 52/0248; H04M 1/72469; Y02D 30/70
See application file for complete search history.

(56) References Cited

U.S. PATENT DOCUMENTS

| | | | | |
|---|---|---|---|---|
| 2011/0029988 | A1* | 2/2011 | Mittal | G06F 9/54 |
| | | | | 719/314 |
| 2011/0038292 | A1 | 2/2011 | Salomone et al. | |
| 2011/0239256 | A1* | 9/2011 | Gholmieh | H04W 72/30 |
| | | | | 725/62 |
| 2014/0204816 | A1 | 7/2014 | Ismail et al. | |
| 2015/0117289 | A1 | 4/2015 | Voigt et al. | |
| 2015/0160976 | A1* | 6/2015 | Kim | G06F 9/4881 |
| | | | | 718/108 |
| 2017/0171818 | A1* | 6/2017 | Agarwal | H04W 52/0229 |
| 2017/0273019 | A1* | 9/2017 | Park | H04W 74/06 |
| 2018/0253135 | A1* | 9/2018 | Singh | G06F 1/3212 |
| 2019/0200171 | A1 | 6/2019 | Huang et al. | |
| 2020/0089306 | A1* | 3/2020 | Oh | H04W 40/244 |
| 2020/0305229 | A1 | 9/2020 | Jin et al. | |
| 2021/0250980 | A1* | 8/2021 | Xue | H04W 52/0216 |
| 2022/0151018 | A1* | 5/2022 | Huang | H04W 76/38 |
| 2022/0272629 | A1* | 8/2022 | Zhao | H04W 72/23 |

FOREIGN PATENT DOCUMENTS

| | | |
|---|---|---|
| CN | 103905168 A | 7/2014 |
| CN | 107949046 A | 4/2018 |
| CN | 108260194 A | 7/2018 |
| CN | 108377484 A | 8/2018 |

* cited by examiner

Bluetooth uses a shared antenna     Bluetooth does not use the shared antenna

Time domain

There is frequency band interference     There is no frequency band interference Time domain Bluetooth uses a shared antenna   Bluetooth does not use the shared antenna Time domain

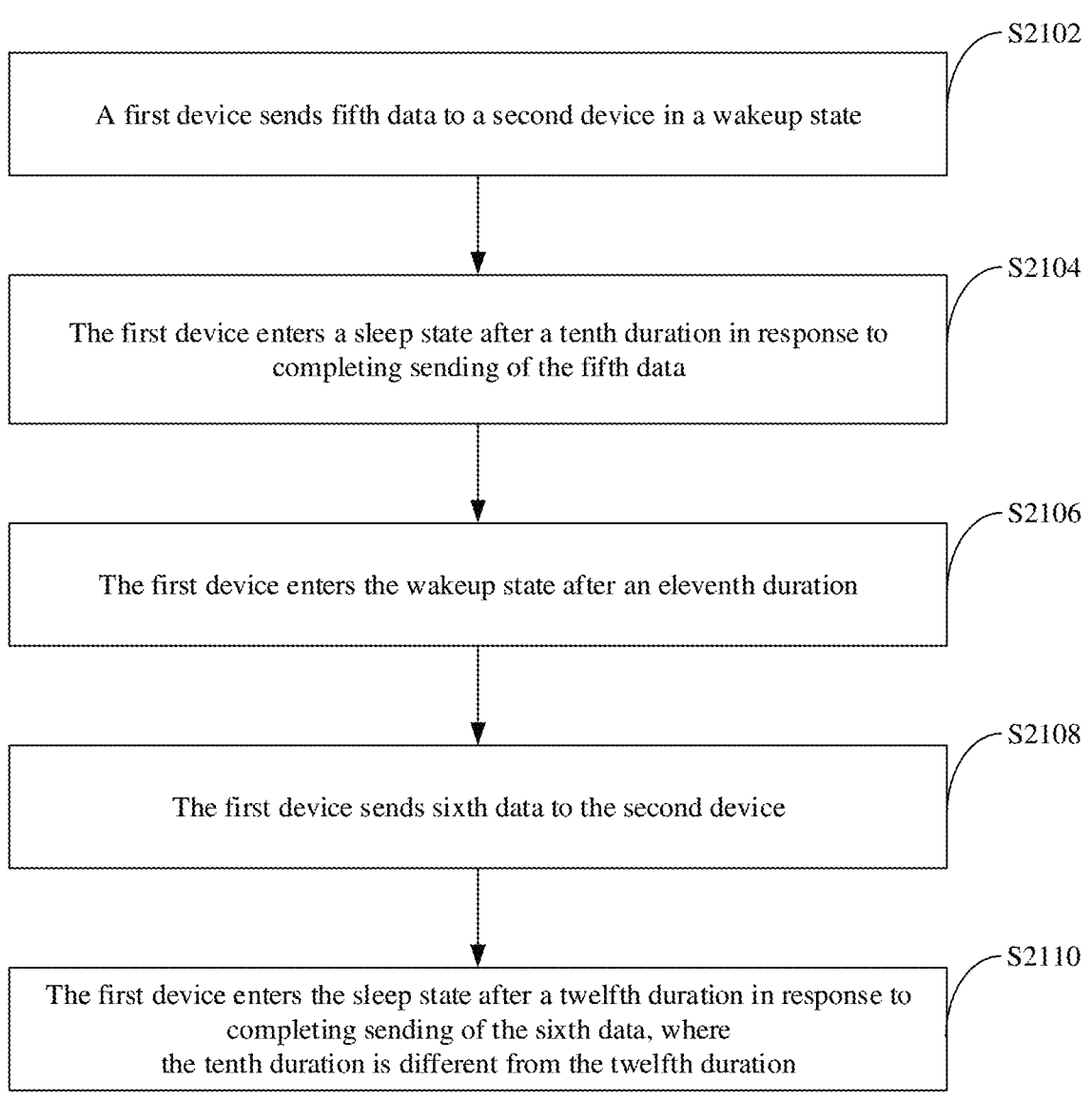

S2102

A first device sends fifth data to a second device in a wakeup state

S2104

The first device enters a sleep state after a tenth duration in response to completing sending of the fifth data

S2106

The first device enters the wakeup state after an eleventh duration

S2108

The first device sends sixth data to the second device

S2110

The first device enters the sleep state after a twelfth duration in response to completing sending of the sixth data, where the tenth duration is different from the twelfth duration

FIG. 21

DATA SENDING/RECEIVING METHOD, ELECTRONIC DEVICE, AND COMPUTER-READABLE STORAGE MEDIUM

CROSS-REFERENCE TO RELATED APPLICATIONS

This application is a National Stage of International Application No. PCT/CN2020/114668, filed on Sep. 11, 2020, which claims priority to Chinese Patent Application No. 201910877530.7, filed on Sep. 17, 2019, both of which are hereby incorporated by reference in their entireties.

TECHNICAL FIELD

This application relates to the computer field, and in particular, to a data sending/receiving method, an electronic device, and a computer-readable storage medium.

BACKGROUND

An electronic device such as a mobile phone, a smart watch, or a smart television can receive and send data by using a wireless network. Currently, the electronic device may support a sleep state and a wakeup state. In a data sending/receiving process of the electronic device, the electronic device may send/receive data in the wakeup state. If the electronic device does not send/receive other data after a fixed duration, for example, 200 ms, the electronic device may disable a wireless transmission module such as an antenna of the electronic device, so that the electronic device is in the sleep state. In this data sending/receiving manner, a sleep opportunity is provided for the electronic device, and therefore power of the electronic device can be saved, power consumption of the electronic device can be reduced, and a standby duration can be prolonged. However, an occasion on which the electronic device enters the sleep state directly affects a degree to which power of the electronic device is saved and power consumption of the electronic device is reduced.

SUMMARY

This application provides a data sending/receiving method, an electronic device, and a computer-readable storage medium, to save power of the electronic device, reduce power consumption of the electronic device, and prolong a standby duration of the electronic device.

According to a first aspect, this application provides a data sending/receiving method. In the method, a first device receives, in a wakeup state, first data sent by a second device; the first device enters a sleep state after a first duration in response to completing receiving of the first data; the first device enters the wakeup state after a second duration; the first device receives second data sent by the second device; and the first device enters the sleep state after a third duration in response to completing receiving of the second data. The first duration is different from the third duration. In this way, in different data sending/receiving cases, the first device may enter the sleep state by using different durations. This can provide more sleep opportunities for a STA, to reduce power consumption.

In this embodiment of this application, the first duration and the second duration are related to a data sending/receiving status of the first device. Specifically, the first duration is associated with at least one of a service volume of the first device, signal strength, an occupation status of a shared antenna, an interference status, a type of a current application in the first device, or a type of the second device; and the second duration is associated with at least one of the service volume of the first device, the signal strength, the occupation status of the shared antenna, the interference status, the type of the current application in the first device, or the type of the second device.

For example, in an embodiment shown in FIG. 6B, when a foreground application in a mobile phone is switched, the mobile phone may enter a sleep state by using different waiting durations. For example, when a current application in the mobile phone is Honor of Kings, the mobile phone may receive data D1 (used as the first data), and then enter the sleep state after a duration t2; or when the foreground application in the mobile phone is WeChat, the mobile phone may receive data D2 (in this case, the data D2 is used as the second data), and then enter the sleep state after a duration t4. The duration t2 is greater than the duration t4, so that sending/receiving of data of a delay-sensitive application and user experience of the application can be ensured. For an application that is not quite sensitive to a delay, the mobile phone quickly enters the sleep state by using a relatively short duration, to save power of the mobile phone, reduce power consumption of the mobile phone, and prolong a standby duration.

For example, in an embodiment shown in FIG. 8, the first device, for example, a STA, may determine, based on a current service volume status, a waiting duration for entering the sleep state. For example, if there is a relatively large service volume when the STA completes receiving of the first data, the first duration may be of a relatively large value, for example, 200 ms; or if currently there is a relatively small service volume when the STA completes receiving of the first data, the first duration may be of a relatively small value, for example, 100 ms or 60 ms. A similar design is used for the second duration. The service volume may be determined based on at least one of a Wi-Fi throughput rate in the STA or a quantity of packets sent/received in a unit time.

For example, in an embodiment shown in FIG. 9, the first device, for example, a STA, may determine, based on current signal strength, a waiting duration for entering the sleep state. For example, if there is relatively high signal strength, the first duration (or the second duration) may be of a relatively small value; or if there is relatively low signal strength, the first duration (or the second duration) may be of a relatively large value.

For example, in an embodiment shown in FIG. 10, the first device, for example, a STA, may determine, based on the occupation status of the shared antenna, a waiting duration for entering the sleep state. For example, if the shared antenna is occupied, the first duration (or the second duration) may be of a relatively large value; or if the shared antenna is not occupied, the first duration (or the second duration) may be of a relatively small value.

For example, in an embodiment shown in FIG. 11, the first device, for example, a STA, may determine, based on the interference status, a waiting duration for entering the sleep state. For example, if there is frequency band interference, the first duration (or the second duration) may be of a relatively large value; or if there is no frequency band interference, the first duration (or the second duration) may be of a relatively small value.

In conclusion, the first device may determine, based on an actual data sending/receiving status, the waiting duration for entering the sleep state. For example, the first duration may be the duration t2 that exists for 200 ms, and the second duration may be the duration t4 that exists for 60 ms or 100 ms. For another example, the first duration may be the duration t4, and the second duration may be the duration t2.

In this embodiment of this application, before the first device enters the sleep state, the first device sends sleep indication information, for example, P1. The sleep indication information is used to indicate that the first device is about to enter the sleep state. For example, in a first beacon period in a scenario shown in FIG. 8, after the duration t2, the STA sends P1 to an AP, and enters the sleep state; and in a second beacon period, after the duration t4, the STA also sends P1 to the AP, and then enters the sleep state.

When the first device is in the sleep state, a wireless transmission capability of the first device is limited. Therefore, after receiving the sleep indication information P1, the second device, for example, the AP, may determine that the first device enters the sleep state. In this case, downlink data of the first device is buffered by the second device.

In this embodiment of this application, a timing start point of the second duration may be a moment at which sending of the sleep indication information P1 is completed. A timing end point of the second duration may be related to a beacon frame (Beacon frame). The beacon frame is periodically broadcast by the second device.

In a possible design, the first device listens to the beacon frame at the timing end point of the second duration. For example, in scenarios shown in FIG. 8 to FIG. 11, the STA may wake up at a sending moment of the beacon frame.

In another possible design, starting from the timing end point of the second duration, the first device listens to the beacon frame after a fourth duration. For example, in a scenario shown in FIG. 13, the STA may wake up before listening to the beacon frame. In this way, after the STA wakes up, the STA listens to the beacon frame only after a duration t5 (used as the fourth duration).

In another possible design, the second duration further includes at least one period duration of the beacon frame. For example, in an embodiment shown in FIG. 14, the timing start point of the second duration is a moment, in a first beacon period, at which the STA completes sending of P1, the timing end point of the second duration is a sending moment of a third beacon frame, and the STA remains in the sleep state in a second beacon period.

In specific implementation of the foregoing solution, the first device may determine the sending moment of the beacon frame by using a transmission period of the beacon frame. The transmission period of the beacon frame may be obtained when the first device is connected to the second device, as shown in FIG. 12.

In this embodiment of this application, when the first device is in the wakeup state, the first device listens to the beacon frame periodically sent by the second device. The beacon frame may be used to indicate whether there is downlink data buffered for the first device in the second device. For example, as shown in FIG. 3, the beacon frame may indicate that there is buffered data for the STA, or may indicate that there is no buffered data for the STA. This depends on an actual communications scenario.

When the beacon frame indicates that there is downlink data buffered for the first device in the second device, the first device sends wakeup indication information, for example, PO shown in FIG. 3. The wakeup indication information is used to indicate that the first device is currently in the wakeup state. In this way, when receiving PO, the second device, for example, the AP, may determine that the STA is in the wakeup state, and may send the buffered data to the STA.

Alternatively, when the beacon frame indicates that there is no downlink data buffered for the first device in the second device, the first device enters the sleep state after a fifth duration, for example, a duration t3 shown in FIG. 3. When there is no buffered data, the first device may quickly enter the sleep state, to reduce power consumption and save power.

In this embodiment of this application, a timing start point of the first duration is a moment at which receiving of the first data is completed. In this case, if the first device receives a plurality of pieces of data in the wakeup state, the first data may be designed as follows:

In a possible design, the first data is data most recently received by the first device. For example, in a second beacon period in a scenario shown in FIG. 17A, the STA sequentially receives data D7 and data D8. The data D8 is data most recently received, and therefore the data D8 is used as the first data. In this case, a moment at which receiving of the data D8 is completed is used as the timing start point, and the STA enters the sleep state after a duration t4. In this implementation, in this waiting process that lasts for the duration t4, if new data is received, a start point of the waiting duration needs to be determined again.

In another possible design, the first data is data first received by the first device in the wakeup state. For example, in a second beacon period in a scenario shown in FIG. 17B, the STA uses data, namely, data D7, first received in the wakeup state as the first data. In this case, the STA uses a moment at which receiving of data D7 is completed as the timing start point, and the STA enters the sleep state after a duration t4. In this implementation, in this waiting process that lasts for the duration t4, regardless of whether there is other data that is sent/received, the timing start point is no longer determined again, and the STA enters the sleep state when timing reaches t4.

In addition, in this embodiment of this application, when the STA is in the sleep state, the STA may wake up when sending uplink data.

In an embodiment, after the first device enters the sleep state after the third duration in response to completing receiving of the second data, the method further includes: The first device enters the wakeup state after a sixth duration; the first device sends third data to the second device; and the first device enters the sleep state after a seventh duration in response to completing sending of the third data.

For example, FIG. 16B shows a possible case. The STA receives data D3 (used as the first data) in the wakeup state; and then after waiting for a duration t2 (the first duration), the STA sends P1, and then enters the sleep state; after the second duration, the STA wakes up at a sending moment of a second beacon frame, and receives data D7 (used as the second data); and then the STA enters the sleep state again after a duration t4 (used as the third duration). Then, this embodiment of this application may further include the following steps: After the sixth duration, the STA wakes up at a sending moment of a third beacon frame, and sends data D5 (used as the third data) in the wakeup state; and after completing sending of the data D5, the STA enters the sleep state again after a duration t6 (used as the seventh duration).

In another embodiment, after the first device enters the wakeup state after the second duration, and before the first device receives the second data sent by the second device, the method further includes: The first device sends fourth data to the second device; the first device enters the sleep state after an eighth duration in response to completing sending of the fourth data; and the first device enters the wakeup state after a ninth duration.

For example, FIG. 16A shows a possible case. The STA receives data D3 (used as the first data) in the wakeup state; and then after waiting for a duration t2 (the first duration), the STA sends P1, and then enters the sleep state; and after the second duration, the STA wakes up at a sending moment of a second beacon frame. The STA may send data D5 (used as the fourth data) in the wakeup state; and after completing sending of the data D5, the STA enters the sleep state again after a duration t6 (used as the eighth duration). Then, after the ninth duration, the STA wakes up when receiving a third beacon frame. In this case, the STA wakes up again. After waking up, the STA may receive data D7 (used as the second data); and then the STA enters the sleep state again after a duration t4 (used as the third duration). Then, this embodiment of this application may further include the following steps: After the sixth duration, the STA wakes up at a sending moment of a third beacon frame, and sends data D5 (used as the third data) in the wakeup state; and after completing sending of the data D5, the STA enters the sleep state again after a duration t6 (used as the seventh duration).

In addition, the STA may enter the sleep state for two or more times in one beacon period. For example, in a scenario shown in FIG. 16C, in a first beacon period, after completing receiving of data D3, the STA enters the sleep state for the first time after a duration t2; and then still in the beacon period, after completing sending of data D5, the STA enters the sleep state for the second time after a duration t6.

In a possible embodiment, the first device is a wireless station STA, and the second device is a wireless access point AP.

In another possible embodiment, the first device may be a STA, and the second device may be another STA.

According to a second aspect, this application provides a data sending/receiving method. In the data sending/receiving method, a first device sends fifth data to a second device in a wakeup state; the first device enters a sleep state after a tenth duration in response to completing sending of the fifth data; the first device enters the wakeup state after an eleventh duration; the first device sends sixth data to the second device in the wakeup state; and the first device enters the sleep state after a twelfth duration in response to completing sending of the sixth data. The tenth duration is different from the twelfth duration.

For details of this embodiment of this application, refer to the first aspect. Details are not described.

According to a third aspect, this application provides an electronic device. The electronic device includes one or more processors, one or more memories, and one or more computer programs. The one or more computer programs are stored in the one or more memories. The one or more computer programs include instructions. When the instructions are executed by the electronic device, the electronic device is enabled to perform the method in any embodiment of the first aspect and/or the second aspect.

According to a fourth aspect, an embodiment of this application further provides a computer storage medium, including computer instructions. When the computer instructions are run on an electronic device, the electronic device is enabled to perform the method according to any one of the foregoing implementations.

According to a fifth aspect, an embodiment of this application further provides a computer program product. When the computer program product runs on an electronic device, the electronic device is enabled to perform the method according to any one of the foregoing implementations.

According to a sixth aspect, this application further provides a chip. The chip is located in a first device, and is configured to perform data sending/receiving with a second device. For example, the chip may be a Wi-Fi chip. When the first device is in a sleep state, the chip is powered off. When the first device is in a wakeup state, the chip is powered on. After the chip is powered on, data may be received and/or sent.

In conclusion, according to the data sending/receiving method, the electronic device, and the computer-readable storage medium provided in this application, a waiting duration suitable for a current service status can be selected based on an actual communication status of the first device. In this way, without affecting service use as much as possible, as many opportunities and durations as possible can be provided for the first device to enter the sleep state. This helps save power of the first device, reduce power consumption of the first device, and prolong a standby duration.

BRIEF DESCRIPTION OF THE DRAWINGS

FIG. 21 is a schematic flowchart of another data sending/ receiving method according to this application.

DETAILED DESCRIPTION OF ILLUSTRATIVE EMBODIMENTS

Implementations of embodiments are described below in detail with reference to the accompanying drawings.

Figure 1:
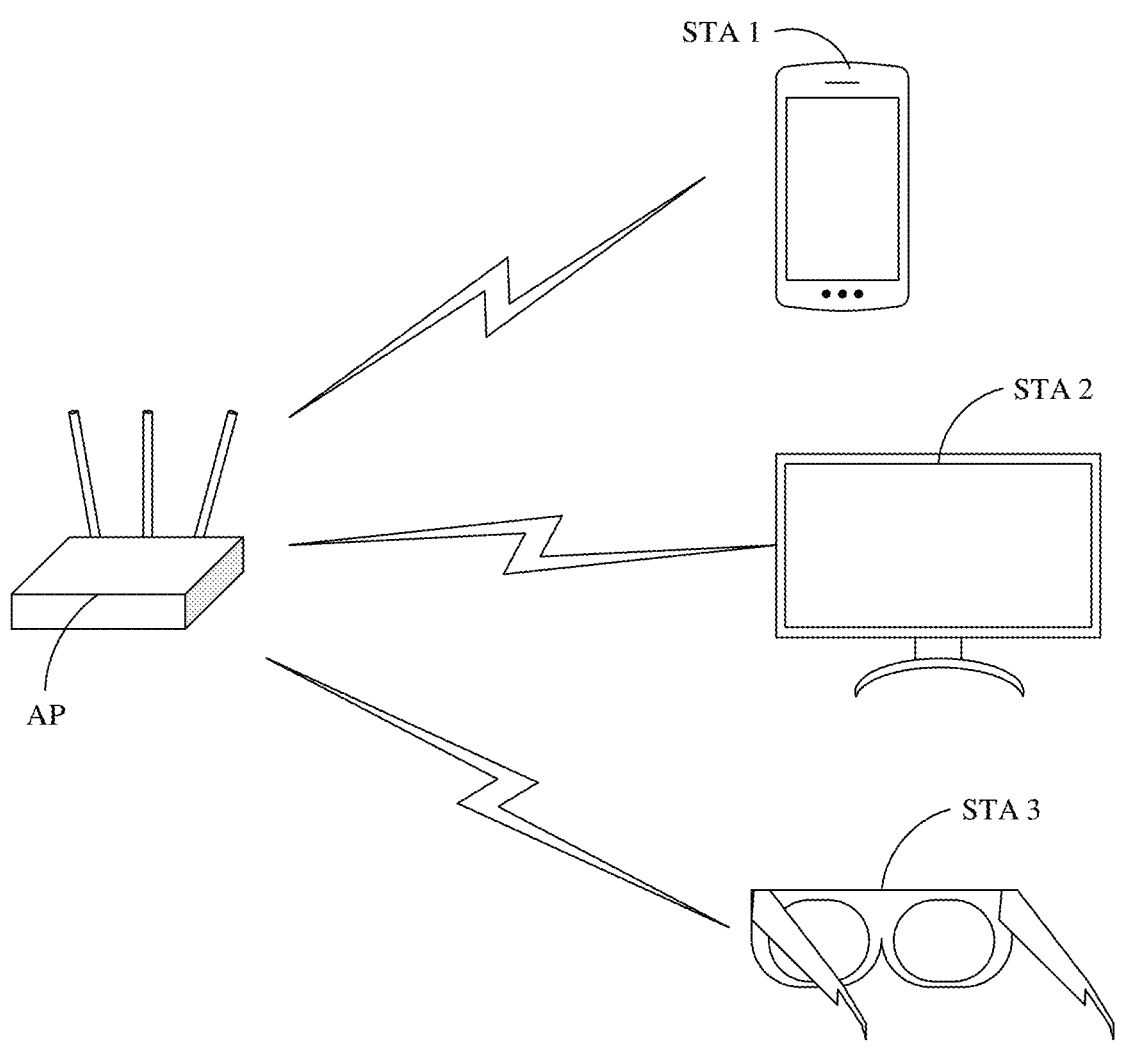
FIG. 1 is a schematic diagram of an architecture of a network system according to an embodiment of this application.

A system architecture in embodiments of this application is first described. FIG. 1 is a schematic diagram of an architecture of a network system according to an embodiment of this application.

As shown in FIG. 1, the network system includes an access point (Access Point, AP) and a wireless station (Station, STA). The AP is also referred to as a wireless AP (Wireless Access Point), a session point, or an access bridge, is a wireless access device, and may be used by a plurality of STAs to access a wireless network. The AP may be of a coverage radius that ranges from tens of meters to hundreds of meters, and may be used for wireless access in a scenario such as a broadband home, a building, or a campus.

For example, FIG. 1 shows a wireless home scenario. In this scenario, the AP may be a device such as a wireless router, a mobile phone STA 1, a smart television STA 2, or a pair of smart glasses STA 3. Both the AP and each STA may support a wireless fidelity (Wireless Fidelity, Wi-Fi) technology, and the STA may separately communicate with the AP, to access a wireless network. In some possible implementation scenarios, a plurality of STAs may communicate with each other by using the AP. As shown in FIG. 1, the mobile phone STA 1 may communicate with the smart television STA 2 by using the AP, so that a user may control the smart television STA 2 by using the mobile phone STA 1 to implement functions such as power-on/power-off, channel switching, and volume adjustment.

In an actual scenario, one network system may include one or more APs, and may further include one or more STAs. For example, in a wireless access scenario in a campus, APs are usually respectively disposed at a plurality of positions. In this way, when using a mobile phone in the campus, a user can access a wireless network by using a nearby AP. It can be understood that when the network system includes a plurality of APs, switching of the AP may be involved when the user (or a handheld STA) is located at a different position. Details are not described.

There may be a plurality of types of APs. The AP may include but is not limited to at least one of a wireless router, a wireless gateway, or a wireless network bridge.

There may also be a plurality of types of STAs. The STA may include but is not limited to an electronic device such as a terminal device, a smart household device, or a wearable device. The terminal device may include but is not limited to a smartphone, a notebook computer, a tablet computer, or a multimedia player. The smart household device may include but is not limited to a smart television, a smart rice cooker, a smart switch, a smart electric lamp, an electronic projector, an intelligent temperature control device, or a smart refrigerator. The wearable device may include but is not limited to a pair of smart glasses, a smart watch, a smart band, or a virtual reality device. The virtual reality device may include but is not limited to a virtual reality (virtual reality, VR) device or an augmented reality (augmented reality, AR) device.

In embodiments of this application, a first device may be a STA, and a second device may be an AP. It can be understood that this should not be construed as a technical limitation to this application. For example, in another embodiment, the first device may be a STA, and the second device may be another STA.

Figure 2:
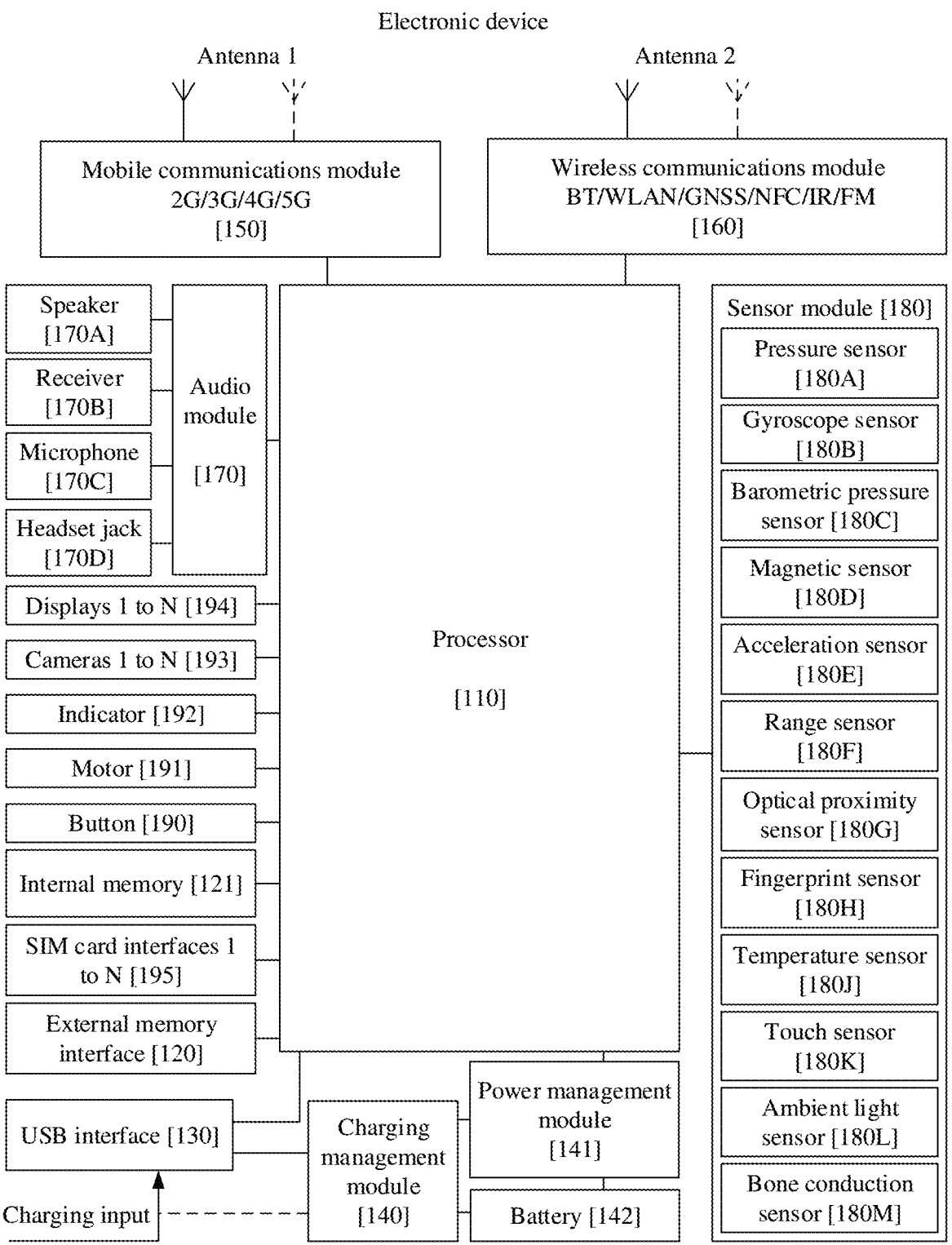
FIG. 2 is a schematic diagram of a structure of an electronic device according to an embodiment of this application.

For example, FIG. 2 is a schematic diagram of a structure of an electronic device according to this application.

The electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor 180, a button 190, a motor 191, an indicator 192, a camera 193, a display 194, a subscriber identity module (subscriber identify module, SIM) card interface 195, and the like. It can be understood that the structure shown in this embodiment does not constitute a specific limitation on the electronic device. The components shown in the figure may be implemented by hardware, software, or a combination of software and hardware.

In some other embodiments of this application, the electronic device may include more or fewer components than those shown in the figure, or combine some components, or split some components, or have different component arrangements. For example, when a STA is a smart television, one or more of the SIM card interface 195, the camera 193, the button 190, the receiver 170B, the microphone 170C, the headset jack 170D, the sensor module 180, the charging management module 140, and the battery 142 may not be disposed in the smart television. For another example, when a STA is a smart watch, one or more of the SIM card interface 195, the receiver 170B, the microphone 170C, the headset jack 170D, and the battery 142 may not be disposed in the smart watch. For another example, when an AP is a wireless router, one or more of the SIM card interface 195, the camera 193, the button 190, the receiver 170B, the microphone 170C, the headset jack 170D, the sensor module 180, the charging management module 140, and the battery 142 may not be disposed in the wireless router.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU). Different processing units may be independent devices, or may be integrated into one or more processors. In some embodiments, the electronic device may also include one or more processors 110. The controller may be a nerve center and a command center of the electronic device. The controller may generate an operation control signal based on instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces a waiting time of the processor 110, thereby improving efficiency of the electronic device.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. The USB interface 130 is an interface that conforms to USB standard specifications, and may be specifically a mini USB interface, a micro USB interface, a USB Type-C interface, or the like. The USB interface 130 may be configured to connect to a charger to charge the electronic device, or may be configured to transmit data between the electronic device and a peripheral device, or may be configured to connect to a headset to play audio through the headset.

It can be understood that an interface connection relationship between the modules shown in this embodiment of the present invention is merely an example for description, and does not constitute a limitation on the structure of the electronic device. In some other embodiments of this application, the electronic device may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device. The charging management module 140 may further supply power to the electronic device through the power management module 141 when charging the battery 142.

The power management module 141 is configured to connect the battery 142 and the charging management module 140 to the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like. The antenna 1 and the antenna 2 are configured to transmit and receive electromagnetic wave signals. Each antenna of the electronic device may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution, applied to the electronic device, to wireless communication including 2G, 3G, 4G, 5G, and the like. The mobile communications module 150 may include at least one filter, a switch, a power amplifier, a low noise amplifier, and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert an amplified signal into an electromagnetic wave for radiation through the antenna 1. In some embodiments, at least some function modules of the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device, to wireless communication including a wireless local area network (wireless local area network, WLAN), Bluetooth, a global navigation satellite system (global navigation satellite system, GNSS), frequency modulation (frequency modulation, FM), NFC, an infrared (infrared, IR) technology, or the like. The wireless communications module 160 may be one or more components integrating at least one communications processing module. The wireless communications module 160 receives an electromagnetic wave through the antenna 2, performs frequency modulation and filtering on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device, the antenna 1 is coupled to the mobile communications module 150, and the antenna 2 is coupled to the wireless communications module 160, so that the electronic device can communicate with a network and another device by using a wireless communications technology. The wireless communications technology may include a GSM, a GPRS, CDMA, WCDMA, TD-SCDMA, LTE, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini LED, a micro LED, a micro OLED, a quantum dot light emitting diode (quantum dot light emitting diode, QLED), or the like. In some embodiments, the electronic device may include one or N displays 194.

The electronic device may implement a photographing function by using the ISP, one or more cameras 193, the video codec, the GPU, one or more displays 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. The electronic device may implement applications such as intelligent cognition through the NPU, for example, image recognition, facial recognition, speech recognition, and text understanding.

The external memory interface 120 may be configured to connect to an external memory card such as a micro SD card, to extend a storage capability of the electronic device. The external storage card communicates with the processor 110 through the external memory interface 120, to implement a data storage function. For example, data files such as music, a photo, and a video are stored in the external memory card.

The internal memory 121 may be configured to store one or more computer programs. The one or more computer programs include instructions. The processor 110 may run the instructions stored in the internal memory 121, so that the electronic device performs a voice switching method provided in some embodiments of this application, various function applications, data processing, and the like. The internal memory 121 may include a program storage area and a data storage area. The program storage area may store an operating system. The program storage area may further store one or more applications (for example, Gallery and Contacts) and the like. The data storage area may store data (for example, a photo or a contact) created when the electronic device is used. In addition, the internal memory 121 may include a high-speed random access memory, or may include a nonvolatile memory, for example, at least one magnetic disk storage device, a flash memory, or a universal flash storage (universal flash storage, UFS). In some embodiments, the processor 110 may run the instructions stored in the internal memory 121 and/or instructions stored in the memory disposed in the processor 110, so that the electronic device performs the voice switching method provided in embodiments of this application, various function applications, and data processing.

The electronic device may implement audio functions such as music playing and recording through the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device may listen to music or answer a hands-free call through the speaker 170A.

The receiver 170B, also referred to as an "earpiece", is configured to convert an audio electrical signal into a sound signal. When the electronic device answers a call or listens to a voice message, the receiver 170B may be placed near a human ear to listen to a voice.

The microphone 170C, also referred to as a "mike" or a "microphone", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device. In some other embodiments, two microphones 170C may be disposed in the electronic device, to implement a noise reduction function in addition to a function of collecting a sound signal. In some other embodiments, three, four, or more microphones 170C may be alternatively disposed in the electronic device, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The sensor 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device determines strength of pressure based on a change of the capacitance. When a touch operation is performed on the display 194, the electronic device detects strength of the touch operation by using the pressure sensor 180A. The electronic device may further calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on a Messages icon, an instruction for viewing an SMS message is executed. When a touch operation whose touch operation strength is greater than or equal to the first pressure threshold is performed on the Messages icon, an instruction for creating an SMS message is executed.

The gyroscope sensor 180B may be configured to determine a motion posture of the electronic device. In some embodiments, an angular velocity of the electronic device around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device shakes, and calculates, based on the angle, a distance for which a lens module needs to compensate, so that the lens cancels the shake of the electronic device through reverse motion, thereby implementing the image stabilization. The gyroscope sensor 180B may be further used in a navigation scenario, a motion-controlled gaming scenario, and the like.

The acceleration sensor 180E may detect a magnitude of an acceleration of the electronic device in each direction (usually, on three axes). When the electronic device is still, a magnitude and a direction of gravity may be detected. The acceleration sensor may be further configured to identify a posture of the electronic device, and is used in an application such as switching between a landscape mode and a portrait mode or a pedometer.

The range sensor 180F is configured to measure a distance. The electronic device may measure a distance in an infrared or a laser manner. In some embodiments, in a photographing scenario, the electronic device may measure a distance by using the range sensor 180F, to implement quick focusing.

The optical proximity sensor 180G may include, for example, a light-emitting diode (LED) and an optical detector such as a photodiode. The light-emitting diode may be an infrared light-emitting diode. The electronic device emits infrared light by using the light-emitting diode. The electronic device detects infrared reflected light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, through the optical proximity sensor 180G, that the user holds the electronic device close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to prevent an accidental touch.

The fingerprint sensor 180H (also referred to as a fingerprint recognizer) is configured to collect a fingerprint. The electronic device may use a feature of the collected fingerprint to implement fingerprint-based unlocking, application lock access, fingerprint-based photographing, fingerprint-based call answering, and the like. In addition, for other records about the fingerprint sensor, refer to the international patent application PCT/CN2017/082773 entitled "NOTIFICATION PROCESSING METHOD AND ELECTRONIC DEVICE", which is incorporated herein by reference in its entirety.

The touch sensor 180K may be also referred to as a "touch panel". The touch sensor 180K may be disposed on the display 194. The touch sensor 180K and the display 194 constitute a touchscreen, which is also referred to as a "touchscreen". The touch sensor 180K is configured to detect a touch operation performed on or near the touch sensor. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device may receive a key input, and generate a key signal input related to user settings and function control of the electronic device.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device. The electronic device may support one or N SIM card interfaces. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

In a wireless communications scenario, both the AP and the STA comply with the IEEE 802.11 protocol. The IEEE 802.11 protocol is a general standard for a wireless local area network. The IEEE 802.11 protocol is a standard for wireless network communication defined by the International Institute of Electrical and Electronics Engineers (IEEE). The IEEE 802.11 protocol defines a media access control layer (MAC layer) and a physical layer. With support of the IEEE 802.11 protocol, two devices may independently construct a temporary network, or may communicate with each other under coordination of a base station (Base Station, BS) or an AP.

In an actual scenario, most STAs that use Wi-Fi are portable mobile devices, and the portable mobile device has limited battery power. Therefore, to save battery power, the IEEE 802.11 protocol supports a power saving mode. In the power saving mode, after the STA accesses a wireless network by using the AP, when no data is transmitted between the AP and the STA, the STA does not need to send/receive data, and may be in a sleep state. When data needs to be transmitted between the AP and the STA, the STA may be actively activated or passively activated to send/receive data. In this case, the STA is in an active state.

The active state may also be referred to as a wakeup state, a wake state, or an active state. That the STA is in an active state means that the STA is in an active mode (Active Mode) specified in the IEEE 802.11 protocol. Specific description is also provided in the IEEE 802.11 protocol: A STA operating in this mode shall have its receiver activated continuously; such STAs do not need to interpret the TIM elements in beacon frames. In other words, when the STA is in the active state, a receive end of the STA may be always in the active state. In this way, the STA does not need to parse a TIM (traffic indication map, Traffic Indication Map) element in a beacon frame.

When the STA is in the sleep state, a wireless transmission capability of the STA is limited. For example, a wireless communications device in the STA is powered off or disabled. The wireless communications device may include but is not limited to a Wi-Fi chip. In addition, the wireless communications device may further include but is not limited to an antenna. When the STA is in the sleep state, the Wi-Fi chip is powered off, and a data transmission function of the Wi-Fi chip is in a disabled state, that is, a transmitter (Transmitter) and a receiver (Receiver) of the Wi-Fi chip are in a disabled state. When the STA is in the wake state, the Wi-Fi chip is powered on, and may receive and/or send data.

Therefore, that the electronic device enters a sleep state may mean that a wireless communications device in the electronic device is powered off, so that the electronic device is in the sleep state. Similarly, that the electronic device enters a wakeup state may mean that the wireless communications device in the electronic device is powered on, so that the electronic device is in the wakeup state.

It should be noted that in this embodiment of this application, when the electronic device is in the sleep state, the wireless communications device in the electronic device is powered off. In this case, another module in the electronic device may be in an enabled state or a disabled state. For example, when the electronic device is in the sleep state, Bluetooth may be in a disconnected state or a connected state. For another example, when the electronic device is in the sleep state, a cellular mobile network may be disconnected or connected. For another example, when the electronic device is in the sleep state, a display mode (or a color mode) of a mobile phone may be a dark mode (Dark Mode, or referred to as a night mode). No enumeration is listed herein.

Therefore, the sleep state in this embodiment of this application may be different from a status that exists when the electronic device is in a power saving mode (or a low power consumption mode or the like). For example, a power saving mode is set in the mobile phone. When the mobile phone runs in the power saving mode, a cellular mobile network and Bluetooth of the mobile phone are disabled, and another function may be further limited. For example, no call can be answered/made. However, a Wi-Fi chip in the mobile phone is not limited, and can continue to send/receive data. Therefore, in this embodiment of this application, when the mobile phone runs in the power saving mode, the mobile phone is in a wakeup state.

Figure 3:
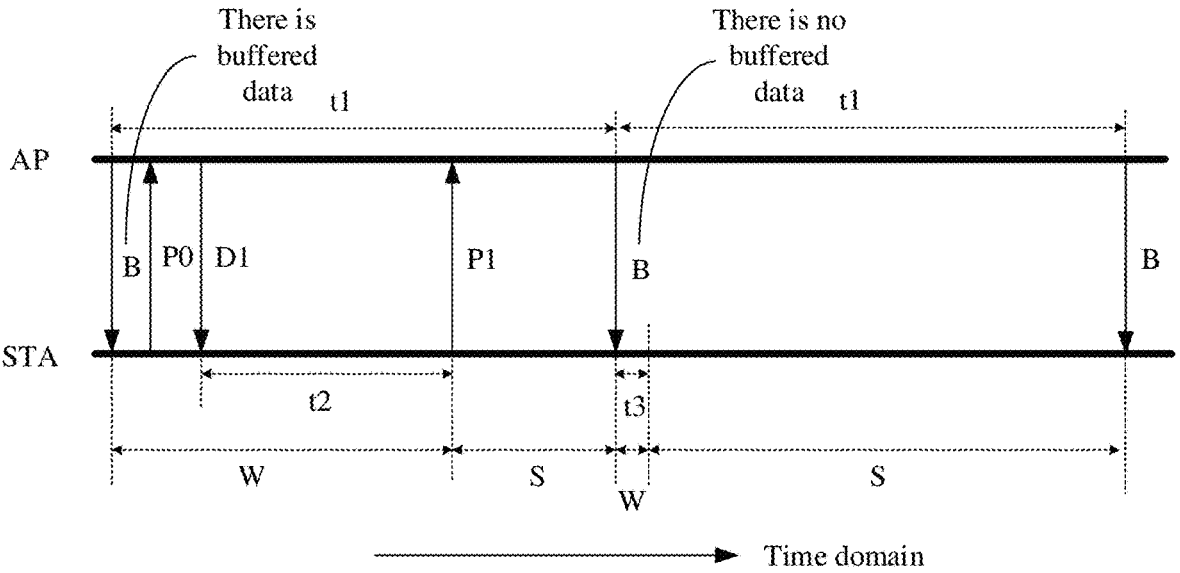
FIG. 3 is a schematic diagram of a data sending/receiving process of an electronic device according to an embodiment of this application.

FIG. 3 shows a scenario in which an AP sends data to a STA. A working state of the STA is described herein with reference to the scenario shown in FIG. 3.

For ease of understanding, reference numerals in FIG. 3 and subsequent drawings are first described. In this embodiment of this application, W represents a wake state, S represents a sleep state, B represents a beacon frame (beacon frame, Beacon frame), D1 and subsequent reference numerals D2 to D6 represent Data (data), and the reference numerals are used to distinguish between different data. The reference numeral t is used to represent a duration, and numerals are used for distinction. P0 is wakeup indication information, and P0 may be sent when the STA wakes up, and is used to indicate that the STA is currently in the wake state. P1 is sleep indication information, and P1 may be sent before the STA enters the sleep state, and is used to indicate that the STA is about to enter the sleep state.

In an embodiment, P0 and P1 may be sleep frames (NULL DATA) that include different power management fields. Specifically, when the STA is in the wake state, the STA may send P0 to the AP. For example, P0 may be a sleep frame that includes a power management field whose indicator is 0. When the STA is about to enter the sleep state, the STA may send P1 to the AP. For example, P1 may be a sleep frame that includes a power management field whose indicator is 1.

In another embodiment, when the STA is in the wake state, the STA may send P0 to the AP. For example, P0 may be a PS-Poll packet, and the PS-Poll packet is used to indicate that the STA is in the wake state. When the STA is about to enter the sleep state, the STA may send P1 to the AP. P1 may be a sleep frame that includes a power management field whose indicator is 1.

As shown in FIG. 3, the AP may periodically broadcast a beacon frame to the outside, and a transmission period is a duration t1. All STAs in a coverage area of the AP may listen (Listen) to the beacon frame sent by the AP.

The beacon frame is a beacon frame, and may carry a plurality of types of information about the AP. The information may include but is not limited to a traffic indication map (Traffic Indication Map, TIM) element, a beacon frame transmission interval (Beacon interval), capability information (Capability info) of the AP, a network name (SSID), country code and available channel resource information (Country), 11n high-rate capability set information (for example, HT Cap and Add HT info), and wireless QoS capability information (for example, WMM). The TIM element may indicate a STA identifier corresponding to data buffered in the AP. The STA identifier may be an ID number of a STA or a device name.

When in the wake state, the STA may listen (Listen) to the beacon frame periodically sent by the AP. As described above, the beacon frame may be used to indicate whether there is downlink data buffered for the STA in the AP. Therefore, after listening to the beacon frame, the STA may determine, based on the TIM element in the beacon frame, whether there is downlink data buffered for the STA in the AP. For ease of description, the downlink data buffered by the AP for the STA is referred to as buffered data.

In a possible embodiment, if an identifier of any STA is one of STA identifiers indicated in the TIM element, it may be determined that the AP stores buffered data for the STA. On the contrary, if the identifier of the STA does not match the STA identifier indicated in a TIM element, it may be determined that there is no buffered data for the STA in the AP. For example, if the TIM element in the beacon frame broadcast by the AP includes an ID of a STA 1, it indicates that there is buffered data for the STA 1 in the AP.

In another possible embodiment, the beacon frame broadcast by the AP may include the STA identifier and indication information indicating whether there is buffered data for each STA. For example, in the beacon frame broadcast by the AP, information carried in the TIM element may include: STA 1: yes; STA 2: no; STA 3: yes; STA 4: yes. Herein, yes represents that there is buffered data, and no represents that there is no buffered data for the STA. In addition, 0 and 1 (or 1 and 0) or other user-defined identifier symbols may be used to represent that there is buffered data and there is no buffered data. This is not specifically limited in this application.

In this case, in a first beacon period shown in FIG. 3, the STA may send P0 to the AP, to notify the AP that the STA is currently in the wake state. In this way, after receiving P0, the AP determines that the STA is in the wake state and can send/receive data. In this case, the AP may send data D1 buffered for the STA to the STA, and the AP may send the data D1 to the STA by using a unicast packet. In this case, the STA is still in the wake state, is capable of sending/receiving data, and receives the data D1.

As shown in FIG. 3, after the STA receives the data D1, a Wi-Fi chip is in a carrier sense (Carrier sense) state. In this case, data transmission may be directly performed between the STA and the AP. However, if the STA does not send/receive data in a duration t2 after the STA receives the data D1, the STA may send P1 to the AP, and then the STA enters the sleep state. A timing start point of the duration t2 may be a moment at which the STA completely receives the data D1, in other words, timing is started from a moment at which receiving of the data D1 is completed.

The AP may determine, based on the received sleep indication information P1 sent by the STA, that the STA is in the sleep state. In this case, the Wi-Fi chip in the STA is powered off, and a data sending/receiving capability is disabled (or limited). Therefore, in this case, if the AP needs to transmit data to the STA, the AP may buffer the data for the STA. In this way, if the AP buffers data for the STA, when the AP broadcasts a beacon frame to the outside in a next beacon period, a TIM element in the beacon frame may indicate an identifier of the STA.

In a second beacon period shown in FIG. 3, the STA wakes up in the second beacon period, and listens to a beacon frame broadcast by the AP. In this case, when the STA determines, based on a TIM element in the beacon, that there is no buffered data for the STA in the AP, the STA does not need to receive data. In this scenario, if the STA does not need to send data to the AP, the STA may temporarily wake up for a duration t3, and then enter the sleep state, to reduce power consumption.

In a data exchange scenario between the AP and the STA, a specific duration is consumed for receiving and sending each frame. The duration consumed for each frame is not specifically limited in this application, and FIG. 3 also does not specifically show the duration consumed for each frame. In an actual scenario, a duration required for sending/receiving each frame is determined based on factors such as a data volume of each frame and communication quality.

Specifically, FIG. 3 shows three durations: the duration t1, the duration t2, and the duration t3. Specific values of t, t2, and t3 are not specifically limited in this application. In an actual scenario, t1, t2, and t3 may meet a relationship in which t1 is greater than t2, and t1 is greater than t3.

In this embodiment of this application, a duration (a waiting duration for short) that the STA waits for entering the sleep state after waking up and completing data sending/receiving, for example, the duration t2 shown in FIG. 3, is determined based on a current actual communication status.

In other words, in a process of communication between the AP and the STA, a waiting duration in each beacon period is determined based on the current actual communication status. Therefore, there may be a waiting duration for any STA in any beacon period, and there may be different waiting durations in any two beacon periods. For example, in the process of communication between the STA and the AP, for the STA, there is a waiting duration of 60 ms in a beacon period, and there is a waiting duration of 200 ms in another beacon period. Therefore, the waiting duration in each beacon period is related to the current communication status of the STA. In comparison with a manner in which the STA enters the sleep state based on a fixed value in each beacon period, it is equivalent to implementing dynamic adjustment of the waiting duration in this embodiment of this application. For example, in comparison with a manner in which the STA enters the sleep state based on a waiting duration of 200 ms in each beacon period, in this embodiment of this application, the STA may enter the sleep state by using a waiting duration of 60 ms in some beacon periods or all beacon periods. In this way, a quantity of opportunities and durations for entering the sleep state by the STA is increased while normal running of a service of the STA can be ensured, and therefore a quantity of opportunities and durations for powering off a wireless communications device to reduce power consumption is increased. This helps reduce power consumption of the STA, and prolong a standby duration of the STA.

A preset quantity of times the STA enters the sleep state, a preset quantity of waiting durations, and a preset value of the waiting duration are not specifically limited in this application, and may be preset through user definition based on a requirement in a scenario. In an example implementation scenario, the duration t2 may be 200 ms. For example, a duration t4 may be 60 ms. For another example, a duration t4 may range from 60 ms to 100 ms. In another example scenario, the duration t2 may be 300 ms, and a duration t4 may be 200 ms. In another example scenario, the duration t2 may be 300 ms, and a duration t4 may be 60 ms. In an actual scenario, the waiting duration is designed through user definition based on the actual communication status of the STA.

Specifically, the waiting duration in each beacon period may be dynamically adjusted based on at least one of a type (a type of a current application in the STA) of data transmitted between the AP and the STA, a type of the AP, a Wi-Fi service volume status, a signal strength status of the STA, an occupation status of a shared antenna, or an interference status. In this way, a quantity of opportunities and durations for entering the sleep state by the wireless communications device such as the Wi-Fi chip can be increased as much as possible while normal running of the service of the STA is ensured, to reduce power consumption of the STA.

The waiting duration in each beacon period may be adjusted based on the type (or a type of an application corresponding to the data) of the data transmitted between the AP and the STA. Usually, data sent by the AP to the STA may be data of the current application in the STA. Therefore, the waiting duration may be determined based on the type of the current application in the STA.

Figure 4A:
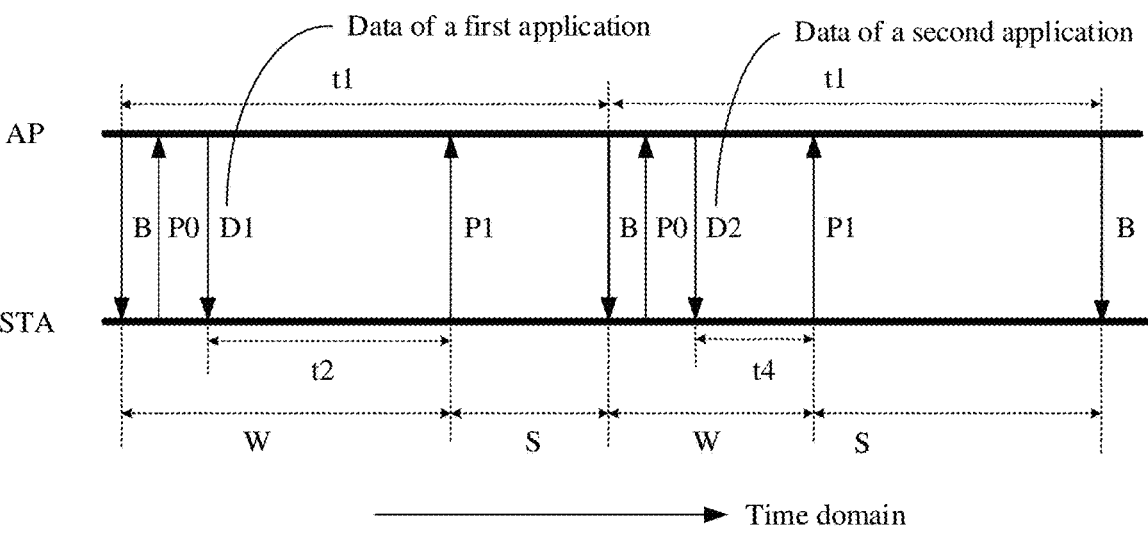
FIG. 4A is a schematic diagram of another data sending/receiving process of an electronic device according to an embodiment of this application.
Figure 4B:
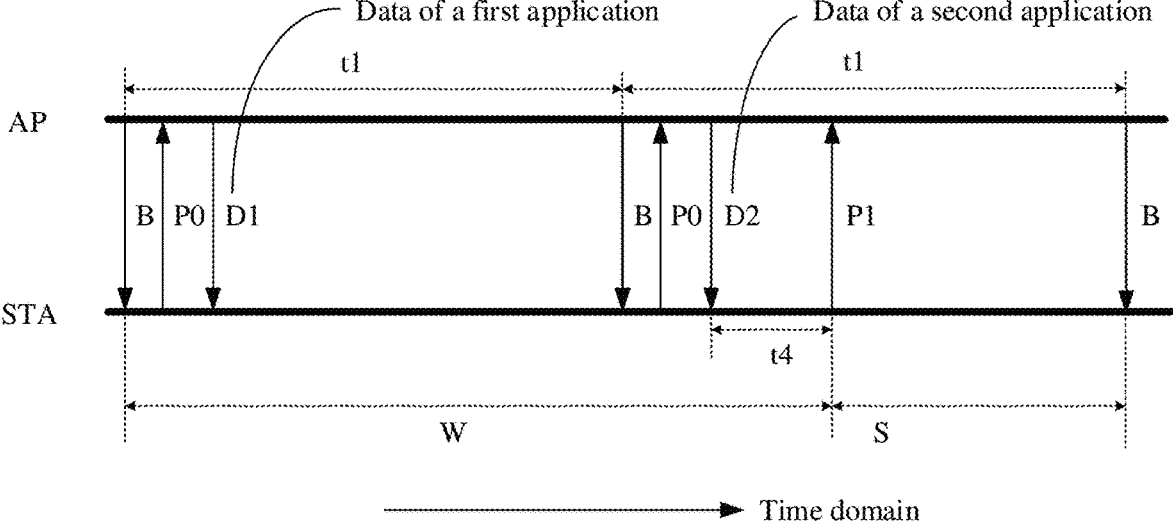
FIG. 4B is a schematic diagram of another data sending/receiving process of an electronic device according to an embodiment of this application.

For example, FIG. 4A and FIG. 4B show a scenario in which the AP sends data to the STA. As shown in FIG. 4A and FIG. 4B, the AP still buffers data for the STA in the foregoing manner. As time elapses, a user switches a foreground application in the STA, and the foreground application is switched from a first application to a second application. In this way, data D1 buffered by the AP for the STA in a first beacon period is data of the first application, and data D2 buffered by the AP for the STA in a second beacon period is data of the second application.

The first application may be a delay-sensitive application (application, Application, APP), for example, a game application such as Honor of Kings; or for another example, a projection application (an APP used to transmit and cast a video in a mobile phone to a display in real time). Data of these apps is relatively sensitive to a delay. For example, if the user plays Honor of Kings by using the mobile phone, a problem such as game freezing or an operation error may be caused if the mobile phone cannot receive data in a timely manner. Consequently, operation experience of the user is affected. Therefore, for this type of application, the STA may enter the sleep state by using a relatively long waiting duration, so that the STA may be in the wake state for a relatively long time, and can send/receive a message in a timely manner, to avoid adverse impact on use of the current application as much as possible.

Correspondingly, the second application may be a delay insensitive application, for example, a chat app such as WeChat, QQ, or Weibo; or for another example, an information app such as ZH or Toutiao; or for another example, a shopping app such as Taobao, Dianping, or Jingdong. Data of these applications has a relatively low requirement on a delay. Therefore, the STA may enter the sleep state by using a relatively short waiting duration, to reduce power consumption of the STA.

FIG. 4A shows a possible embodiment in this scenario.

In the first beacon period, the STA listens to a beacon frame, and sends P0 to the AP. In this way, the AP receives P0, determines that the STA is in the wake state, and sends the data D1 buffered for the STA to the STA. The STA receives the data D1. If an app corresponding to the data D1 is relatively sensitive to a delay, the STA may wait for a duration t2 after completing receiving of the data D1, and if the STA does not send/receive other data in the duration t2, the STA sends P1 to the AP, and changes from the wake state to the sleep state, and the Wi-Fi chip is powered off.

In the second beacon period, the STA listens to a beacon frame, and sends P0 to the AP. In this way, the AP receives P0, determines that the STA is in the wake state, and sends the data D2 buffered for the STA to the STA. The STA receives the data D2. If an app corresponding to the data D2 is not quite sensitive to a delay, the STA may wait for a relatively short duration t4 after completing receiving of the data D2, and if the STA does not send/receive other data in the duration t4, the STA sends P1 to the AP, and changes from the wake state to the sleep state, and the Wi-Fi chip is powered off.

For example, if the STA is a mobile phone, the mobile phone accesses Wi-Fi by using a router (used as the AP).

In the first beacon period shown in FIG. 4A, the current application in the mobile phone may be Honor of Kings. As described above, this instant game app Honor of Kings is relatively sensitive to a delay, and therefore may be used as a first application, and enter the sleep state in the manner in the first beacon period shown in FIG. 4A. That is, the mobile phone receives the data D1 forwarded by the router, and then after completing receiving of the data D1, the mobile phone may wait for a relatively long duration t2, for example, 200 ms, because the data D1 is data of Honor of Kings, and has a relatively high requirement on a delay. In this process, the mobile phone is in the wake state, and can receive or send data in a timely manner. Therefore, a probability that there is game freezing or an operation error can be reduced to some extent. If the mobile phone does not send/receive other data in the 200 ms, the Wi-Fi chip is powered off, and the mobile phone is in the sleep state. In this process, the mobile phone enters the sleep state by using a relatively long waiting duration, to ensure that data of Honor of Kings can be sent/received in a timely manner, and to minimize adverse impact caused by entering the sleep state on game experience.

The user then switches the current application in the mobile phone, closes or pauses Honor of Kings, and opens WeChat to chat with a friend.

In this case, in the second beacon period, the current application in the mobile phone is WeChat. Data of WeChat has a relatively low requirement on a delay, and therefore the mobile phone may enter the sleep state by using a relatively long duration t4. For example, t4 may be 60 ms. In this way, the mobile phone receives the data D2 forwarded by the router. The data D2 is data of WeChat, and has a relatively low requirement on a delay. Therefore, the mobile phone may wait for 60 ms after completing receiving of the data D2. If the mobile phone does not send/receive other data in the 60 ms, the Wi-Fi chip is powered off, and the mobile phone is in the sleep state. In this process, the mobile phone enters the sleep state by using a relatively short waiting duration. In this way, a duration in which the mobile phone is in the sleep state is prolonged as much as possible while it is ensured that the user can use WeChat to chat and communicate normally. This helps reduce power consumption of the mobile phone and prolong a standby duration of the mobile phone.

In addition, in another embodiment, when the foreground application in the mobile phone is Honor of Kings, to ensure timely sending/receiving of data of this instant game as much as possible, a relatively long waiting duration may be set for the mobile phone. For example, the mobile phone may wait for 300 ms after completing receiving of the data D1. When the current application in the mobile phone is a common application, for example, WeChat, the mobile phone may wait for 200 ms. In other words, a waiting duration for the delay-sensitive application is prolonged.

In addition, in another embodiment, apps may be classified into at least two categories, and each category corresponds to a fixed waiting duration. For example, the apps in the mobile phone may be classified into three categories based on sensitivity of the apps to a delay: a delay-sensitive application such as Honor of Kings, a common application such as WeChat, and a delay-insensitive application such as iReader. In this case, the mobile phone may enter the sleep state by using 400 ms for the delay-sensitive application; may enter the sleep state by using 200 ms for the common application; and may enter the sleep state by using 60 ms for the delay-insensitive application. In an actual scenario, a corresponding identifier may be further added for each category, so that the waiting duration to be used by the mobile phone is determined based on the identifier. This example is merely an example, and should not constitute a specific value or manner limitation.

FIG. 4B shows another possible embodiment in this scenario.

In the first beacon period, the STA listens to a beacon frame, and sends P0 to the AP. In this way, the AP receives P0, determines that the STA is in the wake state, and sends the data D1 buffered for the STA to the STA. The STA receives the data D1. An app corresponding to the data D1 is relatively sensitive to a delay. Therefore, after completing receiving of the data D1, the STA may not enter the sleep state in the beacon period. As shown in FIG. 4B, the STA is continuously in the wake state in the first beacon period.

In the second beacon period, the STA listens to a beacon frame, and sends P0 to the AP. In this way, the AP receives P0, determines that the STA is in the wake state, and sends the data D2 buffered for the STA to the STA. The STA receives the data D2. An app corresponding to the data D2 is not quite sensitive to a delay. Therefore, after completing receiving of the data D2, the STA may wait for a duration, and if the STA does not send/receive other data in the waiting duration, the STA sends P1 to the AP, and changes from the wake state to the sleep state, and the Wi-Fi chip is powered off. In this scenario, different designs may be used for the waiting duration. For example, the waiting duration may be a waiting duration t4 shown in FIG. 4B, or may be a waiting duration t2 (not shown in FIG. 4B). Details are subsequently described.

This case may be caused by a relatively long waiting duration, or may be specially designed because the current application in the STA is sensitive to a delay. Data exchange between the mobile phone and the router is still used as an example. In the first beacon period, the user plays Honor of Kings by using the mobile phone. Honor of Kings is relatively sensitive to a delay, and therefore the Wi-Fi chip may be kept to be always powered on, so that the mobile phone has a good data sending/receiving capability. In the second beacon period, the user chats with another person or browses a message pushed by an official account by using WeChat. WeChat has a relatively low requirement on a delay, and therefore the mobile phone waits for a duration, for example, 200 ms or 60 ms, in the wake state, and if no data is exchanged in the waiting duration, the STA may send P1 to the AP, and enter the sleep state.

In design of the foregoing solution, the STA may use, based on information indicating whether an app corresponding to received data is sensitive to a delay, a different sleep policy shown in FIG. 4A or FIG. 4B.

In an embodiment, whether an app is sensitive to a delay may be determined based on a type of the app. For example, in the foregoing embodiment, if the current application in the mobile phone is an instant game app or a projection app, it may be considered that the app is sensitive to a delay, and processing is performed in the manner shown for the first application in FIG. 4A or FIG. 4B. On the contrary, if the current application in the mobile phone is a chat app or a reading app, it may be considered that the current application in the mobile phone has a relatively low requirement on a delay, and processing is performed in the manner shown for the second application in FIG. 4A or FIG. 4B.

In addition, in another embodiment, an app list may be further preset in the STA. An app in the app list is an app sensitive to a delay, and an app that is not in the list may be considered as an app that is not quite sensitive to a delay. For example, the app list may be an application list in an extreme mode shown in FIG. 5a, FIG. 5b, FIG. 5c, and FIG. 5d.

In specific implementation, the app list may be set by default before an electronic device is delivered.

Alternatively, the app list may be set by default before an electronic device is delivered, and in a subsequent process of using the electronic device, the app list is updated by using a network or another communication means such as Bluetooth. For example, the app list that is preset before the mobile phone is delivered includes only Honor of Kings. As time elapses, the app list may be further updated to include Honor of Kings and Tencent Video, or the app list is updated to include Ninja Must Die. In other words, when the preset app list is updated, an updated app list may include an app that exists before the app list is currently updated, or an app that exists before the app list is currently updated may be deleted.

Alternatively, the app list may be set by default before an electronic device is delivered, and the user may further perform personalized configuration on the default setting. For example, the app list that is preset before the mobile phone is delivered includes only Honor of Kings. In this case, the user may add another app to the app list, or may delete Honor of Kings from the preset app list, or may modify configuration of the app list through user definition based on a user requirement. For another example, the app list that is preset before the mobile phone is delivered includes only Honor of Kings. In this case, the user may add another app to the app list, but cannot delete Honor of Kings from the preset app list. In other words, a preset application in the app list that is preset before the mobile phone is delivered may be alternatively configured to be not deleted by the user.

Alternatively, the preset app list may be completely manually configured by the user. In this case, it is considered by default that the preset app list is empty before delivery, and the app list is not updated subsequently by a system or a developer, but instead the user manually add or delete an application.

A mobile phone is used as an example. FIG. 5a, FIG. 5b, FIG. 5c, and FIG. 5d show a setting manner in which the user manually sets the app list.

Figure 5A:
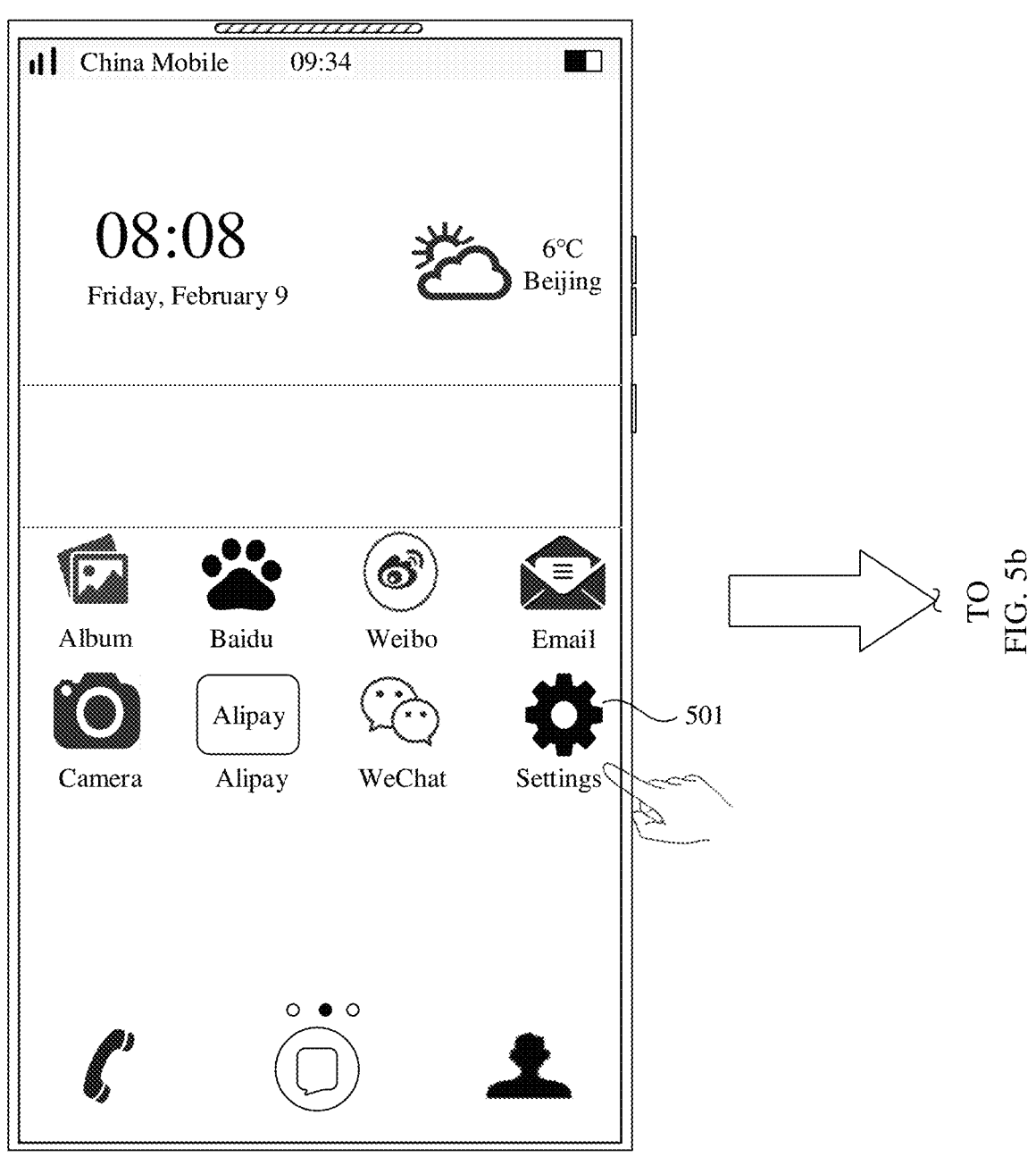
FIG. 5a, FIG. 5b, FIG. 5c, and FIG. 5d are a schematic diagram of a GUI interface of an electronic device according to an embodiment of this application.
Figure 5B:
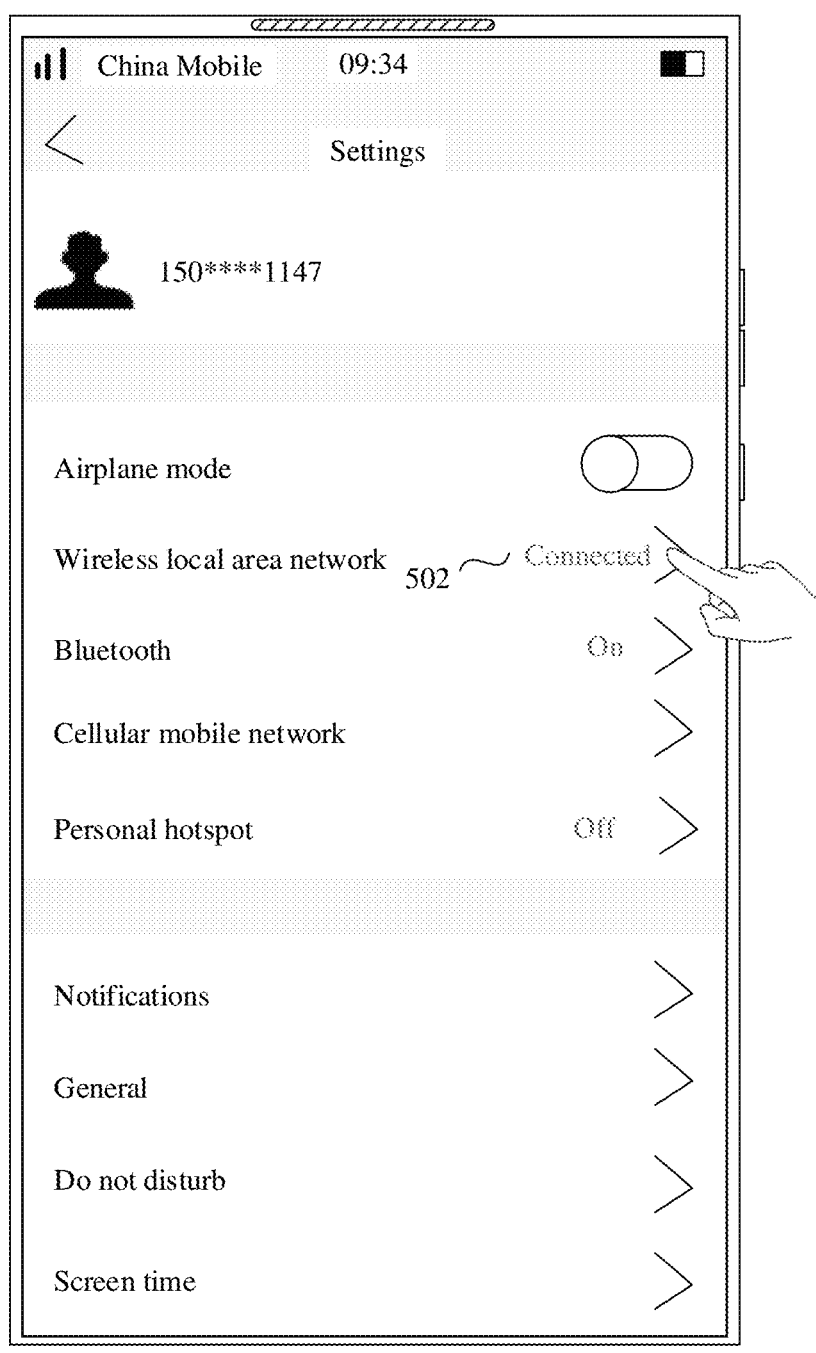
Figure 5B:
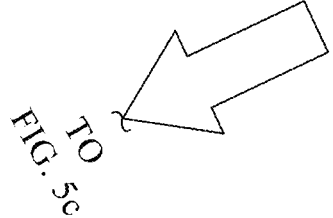
Figure 5C:
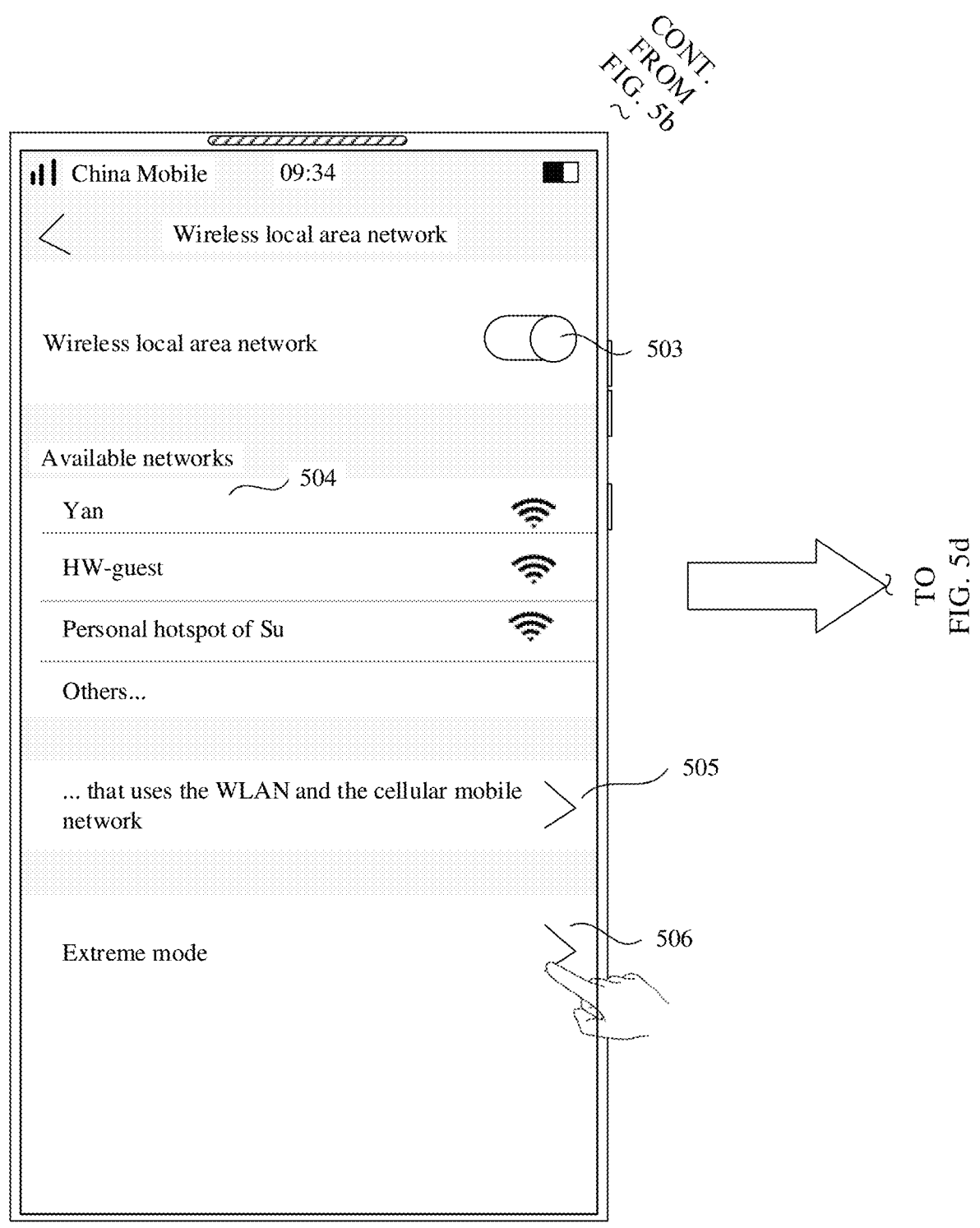
Figure 5D:
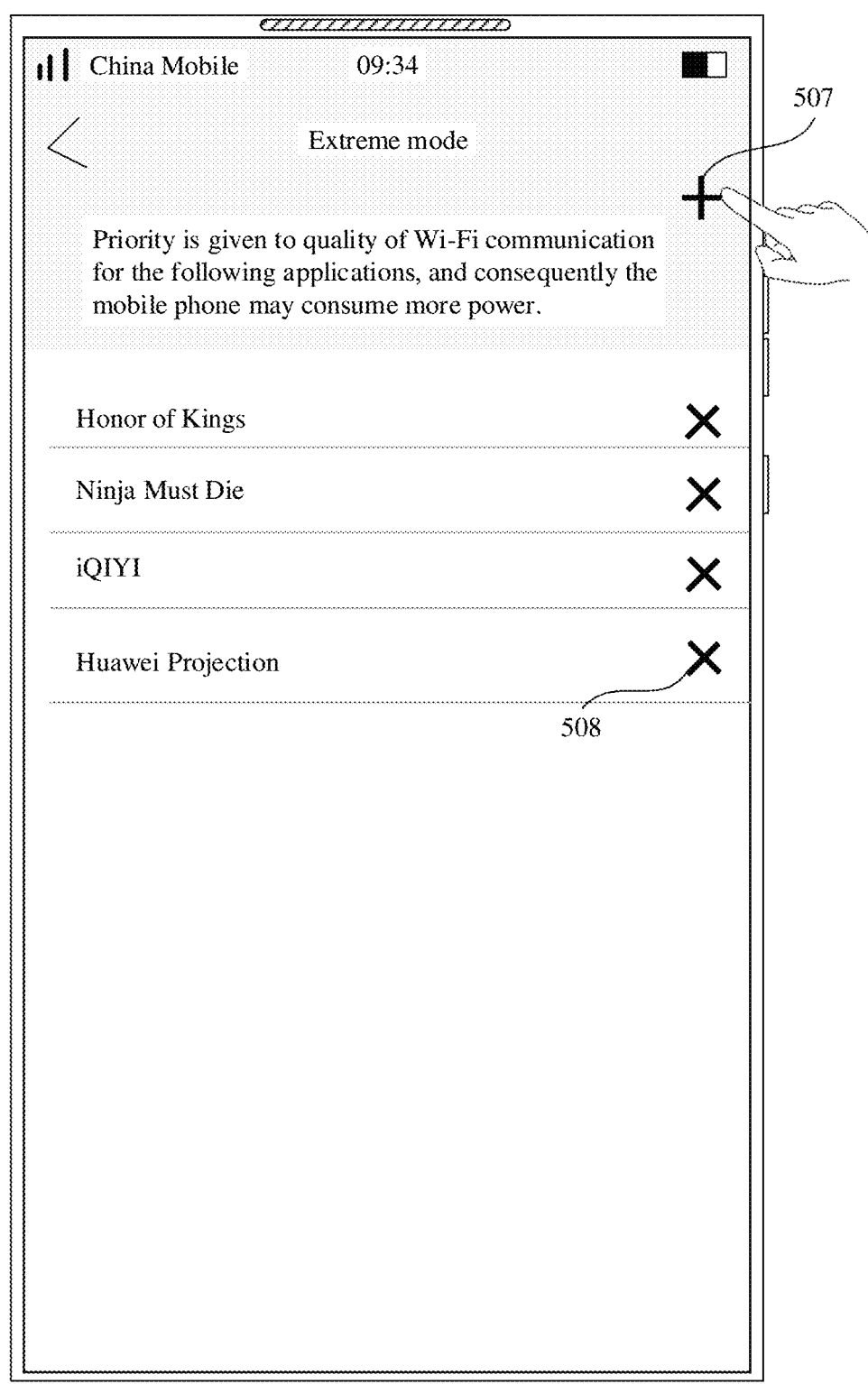

An interface shown in FIG. 5a is a schematic diagram of a desktop of the mobile phone. Icons of various apps may be displayed on the desktop of the mobile phone. The user may tap any app icon to enter a corresponding application, and the corresponding application provides a service for the user. If the user taps a settings icon 501 on the interface in FIG. 5a, the mobile phone displays an interface shown in FIG. 5b. The interface shown in FIG. 5b is a main settings interface of the mobile phone, and the user may perform a tap operation on the interface in FIG. 5b, to set the mobile phone. As shown in FIG. 5a, FIG. 5b, FIG. 5c, and FIG. 5d, the user may tap a virtual button 502 to further set a wireless local area network. In this case, the mobile phone presents an interface shown in FIG. 5c. On the interface shown in FIG. 5c, the user may tap a virtual button 503 to enable or disable the wireless local area network (WLAN). On the interface in FIG. 5c, the wireless local area network is enabled. In this case, a network list 504 is displayed on the interface in FIG. 5c. Names and signal strength (a symbol on a right side) of wireless networks are displayed in the network list 504. The user may tap any one of the wireless networks in the network list 504 to establish a wireless connection. In addition, the user may further tap the virtual button 505 to set an app that can use the wireless local area network. In addition, a virtual button 506 corresponding to the "extreme mode" is further displayed on the interface in FIG. 5c, and the user may tap the virtual button 506 to enter a settings interface (an interface in FIG. 5d) applied in the extreme mode. Furthermore, the extreme mode may be further described on the interface in FIG. 5d: "Priority is given to quality of Wi-Fi communication for the following applications, and consequently the mobile phone may consume more power". On the interface in FIG. 5d, a virtual button 507 is disposed, and the user may tap the virtual button 507 to select an app installed in the mobile phone, and display the selected app in the app list in the extreme mode. As shown in FIG. 5a, FIG. 5b, FIG. 5c, and FIG. 5d, the app list in the extreme mode is displayed on the interface in FIG. 5d. In this case, the app list includes four applications selected by the user, a delete button 508 is further correspondingly displayed on a right side of each application, and the user may tap the delete button 508 to remove the corresponding app from the application list in the extreme mode. Based on this, the user may add an application corresponding to the extreme mode based on o a personal preference or requirement.

It should be noted that when adding, through user definition, an application to the app list corresponding to the extreme mode shown in FIG. 5a, FIG. 5b, FIG. 5c, and FIG. 5d, the user may add a first application that is sensitive to a delay or an application that has a relatively low requirement on a delay. In other words, higher flexibility is achieved for the app list, in the extreme mode, manually created by the user, to meet a requirement of setting, by the user, the mobile phone of the user through user definition.

In this scenario, an application in the app list in the extreme mode may be used as a first application. For example, if Huawei Projection is an application located in the application list on the interface shown in FIG. 5d, Huawei Projection is used as a first application. In this case, the mobile phone enters the sleep state in the manner shown in the first beacon period in FIG. 4A, that is, enters the sleep state by using a relatively long waiting duration. Alternatively, the mobile phone uses the manner shown in the first beacon period in FIG. 4B, that is, does not enter the sleep state in the beacon period, and the mobile phone is continuously in the wake state. For another application that is not in the app list, for example, an application NetEase Music that is not on the interface shown in FIG. 5d, NetEase Music may be used as a second application. In this case, the mobile phone enters the sleep state in the manner shown in the second beacon period in FIG. 4A or FIG. 4B, to reduce power consumption.

In this embodiment of this application, the waiting duration for entering the sleep state may be dynamically adjusted based on the type of the AP.

Figure 6A:
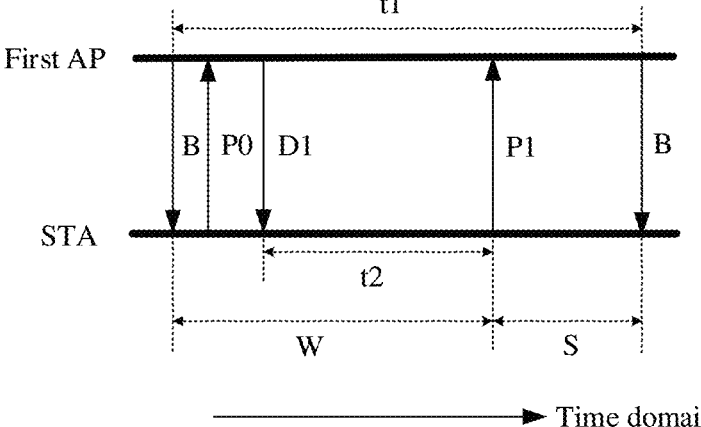
FIG. 6A is a schematic diagram of another data sending/receiving process of an electronic device according to an embodiment of this application.
Figure 6A:
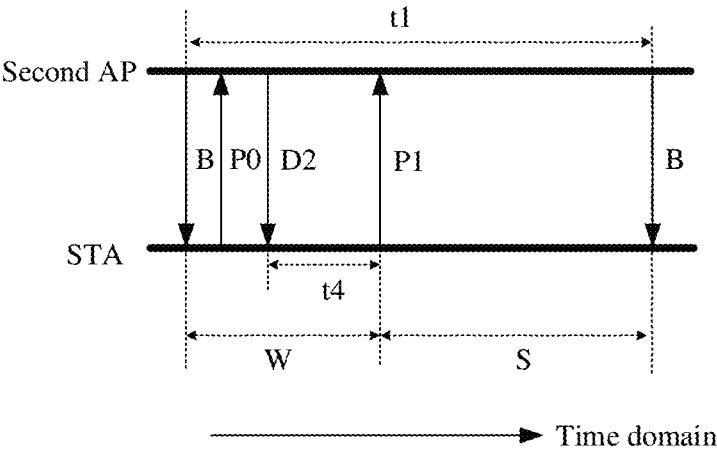

For example, FIG. 6A shows another scenario in which the AP sends data to the STA. As shown in FIG. 6, both a first AP and a second AP may exchange data with the STA, and the first AP is different from the second AP. A network access status of the STA may vary with an AP connected to the STA.

For example, in a home communication scenario, a mobile phone is used as the STA. The first AP may be a television. The mobile phone may be connected to the television, and control the television to play a program or another function. In this case, the mobile phone and the television are in a local wireless network environment, there is no data exchange with an external network, and the STA may even be disconnected from the external network. The second AP may be a router. The mobile phone may be connected to the router to access an external network. In this case, the user may chat with a friend that is thousands of miles away by using the mobile phone, and the mobile phone exchanges data with a device in the external network by using the router.

In this way, after the STA receives data D1 sent by the first AP, the STA waits for a duration t2. If the STA does not send/receive data in the duration t2, the STA changes from the wake state to the sleep state. If the STA receives data D2 sent by the second AP, the STA may wait for a duration t4. If the STA does not send/receive data in the duration t4, the STA enters the sleep state.

In another implementation scenario, if the STA receives data sent by the first AP, the STA may use a manner similar to that in FIG. 4B, that is, does not enter the sleep state in a beacon period corresponding to the first AP, is continuously in the wake state until a next beacon period, and then determines, based on the type of the AP, the type of the current application in the STA, and the like, whether to enter the sleep state and how to enter the sleep state. Details are not described.

In a possible design in FIG. 6A, the STA connected to the first AP does not enter the sleep state, or may enter the sleep state by using a relatively long waiting duration. For example, the mobile phone connected to the television may not enter the sleep state, and a Wi-Fi chip in the mobile phone is continuously in a powered-on state, to ensure that data exchange with the television can be performed at any time. Alternatively, the mobile phone connected to the television may enter the sleep state by using a relatively long waiting duration of 200 ms. The STA connected to the second AP may enter the sleep state by using a relatively short waiting duration, or may enter the sleep state by using a relatively long waiting duration, or may not enter the sleep state. For example, if the current application is Honor of Kings, the mobile phone connected to the router may not enter the sleep state, or may enter the sleep state by using a waiting duration of 200 ms. Alternatively, if the current application is WeChat, the mobile phone may enter the sleep state by using a waiting duration of 60 ms.

For example, in a possible embodiment, if the STA is connected to the first AP, for example, the television, and the current application in the current STA is a first application, for example, Honor of Kings, the STA may not enter the sleep state until the current application in the STA is switched. Subsequently, when the current application in the STA is switched from the first application to a second application, for example, is switched to Weibo, the STA may enter the sleep state by using a relatively long duration, for example, 200 ms. Alternatively, if the STA is connected to the second AP, for example, the router, and the current application in the current STA is a first application, for example, Honor of Kings, the STA may enter the sleep state by using 200 ms. Subsequently, when the current application in the STA is switched from the first application to a second application, for example, is switched to Weibo, the STA may enter the sleep state by using 60 ms.

In a possible network scenario, an "AP list" may be preset in the STA. When the STA is connected to an AP in the AP list, the STA does not enter the sleep state, or enters the sleep state by using a relatively long waiting duration. In other words, the AP list may include one or more first APs. In this way, when the AP performs data exchange with the STA, the STA may obtain an identifier of the associated AP for the current data exchange, and compare the identifier of the associated AP with the AP list. If the identifier of the associated AP (namely, an AP currently connected to the STA) is in the AP list, the STA is connected to a first AP, and the STA may enter the sleep state by using a duration t2, or does not enter the sleep state. If the identifier of the associated AP is not in the AP list, the STA is connected to a second AP, and may enter the sleep state by using a duration t4 or a duration t2. In this implementation, the AP list needs to be preset in the STA, and there is a relatively heavy workload of setting the AP list in the STA, but there is a convenient and efficient manner of determining the waiting duration.

In another possible network scenario, the STA may determine, based on a status of communication with an AP, whether the AP is a first AP or a second AP. For example, the STA may obtain at least one of a packet receiving success rate, a packet sending success rate, transmission efficiency, Wi-Fi signal strength, a connection frequency, or a data transmission volume between the STA and any associated AP based on historical transmission data of an AP connected to the STA, and perform digital processing on the data, to obtain a score of the AP. The score of the AP may be used to represent a data transmission capability between the AP and the STA. In this case, a higher score of the AP indicates a better data transmission capability of the AP and higher data transmission efficiency, and therefore the STA may enter the sleep state by using a relatively short waiting duration. On the contrary, a lower score of the AP may indicate a poorer data transmission capability of the AP. In this case, if there is a data transmission failure, the STA is still in the wake state because of a relatively long waiting duration, and can request, as soon as possible, the AP to transmit data again, to avoid a case in which the STA quickly enters the sleep state, and needs to wait for a very long time to obtain again data that encounters a transmission failure. Therefore, the STA may enter the sleep state by using a relatively long waiting duration, or may not enter the sleep state. Based on this, the score of the AP may be compared with a preset score threshold. If the score of the AP is greater than the preset score threshold, the AP may be identified as a second AP in the STA. Otherwise, the AP is identified as a first AP. Therefore, the STA may further record the first AP at a fixed storage location based on this manner, to form the "AP list". Details are not described. In this scenario, the STA may automatically distinguish between AP types based on historical transmission data, and the AP list in the STA does not need to be preset in advance, thereby reducing a workload of manually maintaining the AP list.

In another possible network scenario, when an AP is connected to the STA for the first time, the AP may send an AP type of the AP to the STA, so that when being connected to the AP, the STA may use a different sleep mode based on the AP type.

The STA quickly enters the sleep state by using a fast sleep mode, to reduce power consumption of the STA, and prolong a standby duration of the STA.

The implementations shown in FIG. 4A, FIG. 4B, and FIG. 6A may be independently implemented, or may be combined for implementation.

Figure 6B:
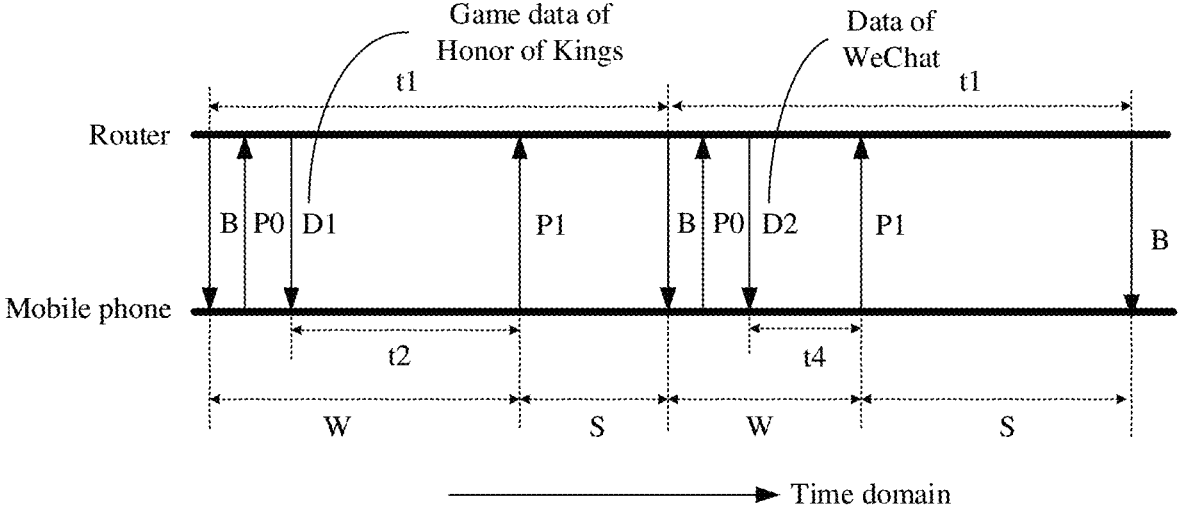
FIG. 6B is a schematic diagram of another data sending/receiving process of an electronic device according to an embodiment of this application.

For example, refer to FIG. 6B. FIG. 6B shows another scenario in which the AP sends data to the STA. In this implementation scenario, the mobile phone accesses a wireless network by using a router. In this case, the router is not an AP in the preset AP list, and the mobile phone may enter the sleep state by using t2 or t4. In a first beacon period shown in FIG. 6B, the router buffers game data D1 of Honor of Kings for the mobile phone. The data D1 has a relatively high requirement on a delay. Therefore, the mobile phone may enter the sleep state by using a relatively long waiting duration t2. In a second beacon period shown in FIG. 6B, the router buffers data D2 of WeChat for the mobile phone. The data D2 of WeChat has a relatively low requirement on a delay. Therefore, the mobile phone may quickly enter the sleep state by using a relatively short waiting duration t4, to reduce power consumption of the mobile phone, and prolong a standby duration of the mobile phone.

In conclusion, the type of the AP and the type of data transmitted between the AP and the STA are related to a manner in which the STA enters the sleep state. Therefore, during specific implementation of this solution, whether the STA may quickly enter the sleep state may be determined based the type of the AP and the type of data transmitted between the AP and the STA.

In this embodiment of this application, different sleep modes may be set based on different waiting durations, to dynamically adjust a sleep mode of the STA.

In a possible implementation scenario, two waiting durations, namely, a duration t2 (for example, 200 ms) and a duration t4 (for example, 60 ms), may be set. In this case, a mode in which the STA enters the sleep state by using 200 ms may be referred to as a first sleep mode or a common sleep mode, and a mode in which the STA enters the sleep state by using 60 ms may be referred to as a second sleep mode or a fast sleep mode.

In another possible implementation scenario, a first sleep mode is a common sleep mode, and the STA enters the sleep state by using a duration t1 (beacon period duration). In this case, in any beacon period, the STA is in the wake state, and the STA does not enter the sleep state. A second sleep mode may be a fast sleep mode, and STA enters the sleep state by using a waiting duration of 60 ms.

In another possible implementation scenario, a first sleep mode is a common sleep mode, and there may be two sleep policies: The STA enters the sleep state by using a waiting duration of 200 ms, or does not enter the sleep state. A second sleep mode is a fast sleep mode, and there may be at least one waiting duration. For example, the STA may enter the sleep state by using a waiting duration of 60 ms, or may enter the sleep state by using a waiting duration of 100 ms.

As described above, a division rule of the sleep mode is not specifically limited in this embodiment of this application.

A sleep mode to be used by the STA may be determined in real time based on the type of the AP and the type of the current application in the STA.

Figure 7:
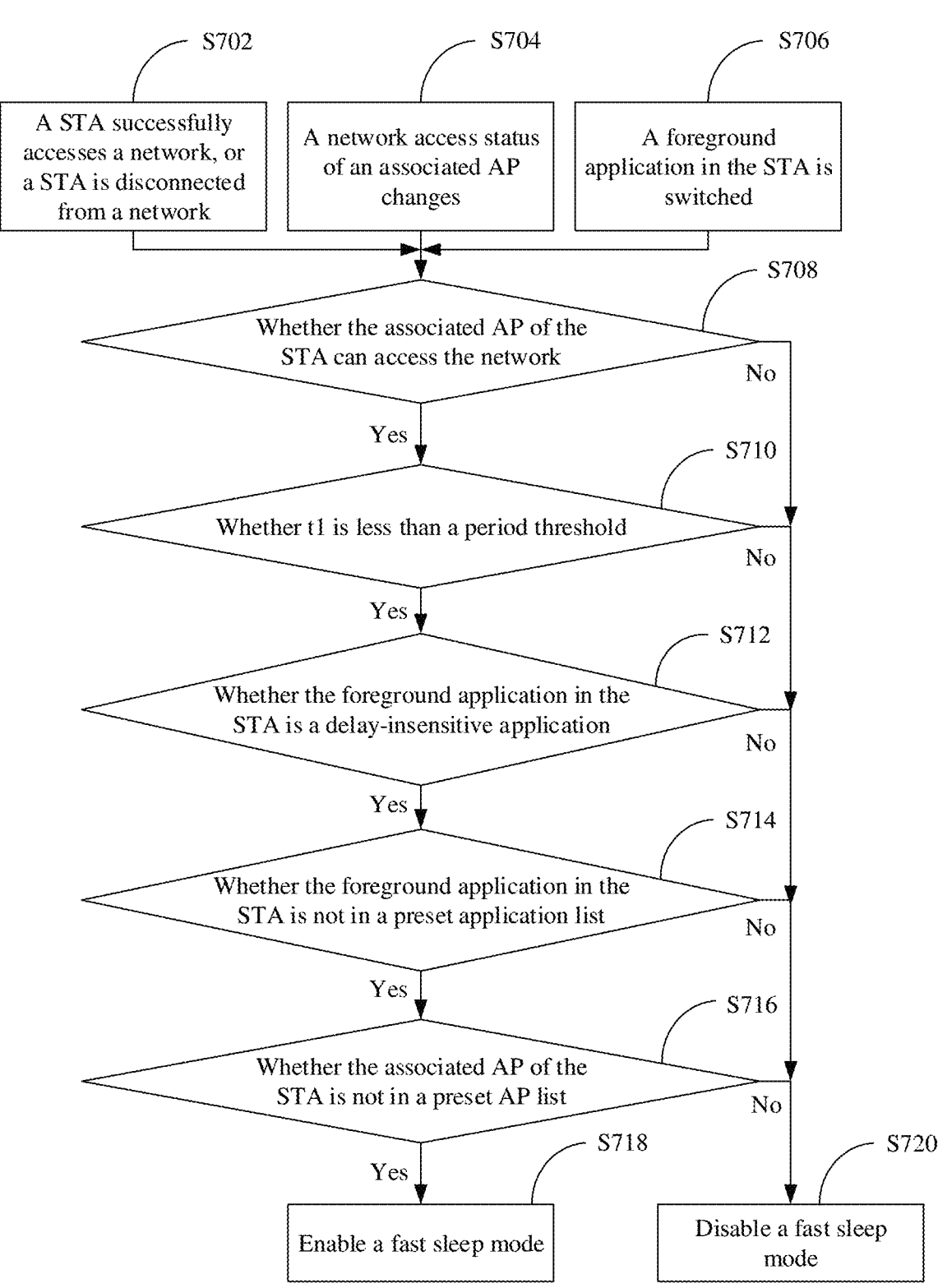
FIG. 7 is a schematic flowchart of a mode switching manner of an electronic device according to an embodiment of this application.

For example, FIG. 7 shows a policy of enabling and disabling the fast sleep mode. FIG. 7 is shown by using an example in which the STA has the fast sleep mode (60 ms) and the common sleep mode (200 ms).

As shown in FIG. 7, when a case in any one of S702, S704, and S706 occurs, determining in S708 to S716 may be performed, to further determine whether to enable or disable the fast sleep mode.

S702. The STA successfully accesses a network, or the STA is disconnected from a network.

In other words, the network access status of the STA changes. If any change shown in S702 occurs in the network access status of the STA, determining processing in subsequent steps S708 to S716 may be directly performed.

S704. A network access status of an associated AP changes.

That is, the STA accesses the wireless network by using the associated AP, and that a network access status of an associated AP of the STA changes includes: The associated AP is disconnected from the network, or the associated AP successfully accesses the network. It can be understood that if the associated AP is disconnected from the network, the STA cannot access the wireless network by using the associated AP, and the STA may be disconnected from the network, or may be handed over from the network.

For example, if the mobile phone currently accesses a wireless network 1 by using a router 1, and the router 1 is faulty or encounters another case, and is disconnected from the network, the mobile phone may be disconnected from the wireless network 1, and access a wireless network 2 by using a router 2. In this case, the associated AP of the STA changes. As shown in FIG. 5a, FIG. 5b, FIG. 5c, and FIG. 5d, the STA may determine, based on a type of the associated AP, a sleep mode to be used.

In addition, the network access status of the STA may vary with an AP connected to the STA. For example, if the mobile phone is connected to a router, the mobile phone may be communicatively connected to an external network. If the mobile phone is connected to a television, local network transmission between the mobile phone and the television may be implemented.

S706. The foreground application in the STA is switched.

In this case, the current application in the STA is switched, and data exchanged between the AP and the STA changes. For example, in a network scenario shown in FIG. 7, when the current application in the mobile phone is switched from Honor of Kings to WeChat, determining in S708 to S716 may be performed, to determine whether a condition for enabling the fast sleep mode is met.

In other words, the STA may keep monitoring events in S702 to S706, so that when it is detected that the event occurs, determining in S708 to S716 is performed.

As shown in FIG. 7, when a determining result in any one of S708 to S716 is "no", S720 is performed to disable the fast sleep mode. When determining results in all of S708 to S716 are "yes", S718 is performed to enable the fast sleep mode. It can be understood that FIG. 7 is an example implementation procedure. A sequence of performing S708 to S716 is not specifically limited in this embodiment of this application, and S708 to S716 may be performed in any reverse sequence, or all or some of the determining steps may be performed in parallel.

S708. Whether the associated AP of the STA can access the network.

As described above, the STA can access the wireless network only when the associated AP of the STA can access the network. Therefore, that the associated AP successfully accesses the network may be used as one of prerequisites for enabling the fast sleep mode.

S710. Whether a duration t1 is less than a preset period threshold.

The period threshold may be preset as required. For example, the period threshold may be 100 ms.

In other words, it is determined whether there is a relatively short period duration in which the associated AP of the STA sends a beacon frame. If the duration t1 is relatively short (for example, is less than 100 ms), in a beacon period, a time from a moment at which the STA receives data to a moment at which a next beacon frame is sent may be less than a preset waiting duration. In this case, the STA may be continuously in the wake state, or there is a relatively short duration in which the STA is in the sleep state, or a quantity of times the STA is in the sleep state is relatively small, and consequently power consumption of the STA is relatively large. Therefore, when there is a relatively short period duration in which the AP sends the beacon frame, the fast sleep mode may be enabled, so that the STA may enter the sleep state by using a shorter waiting duration, to increase the duration in which the STA is in the sleep state and the quantity of times the STA is in the sleep state, and reduce power consumption.

Based on this, that the duration is less than the preset period threshold may be used as one of the prerequisites for enabling the fast sleep mode.

S712. Whether the current application in the STA is a delay-insensitive application.

If the current application in the STA is sensitive to a delay, a relatively long waiting duration is required, and the common sleep mode is more conducive to timely data sending/receiving.

On the contrary, if the current application in the STA is not quite sensitive to a delay, the waiting duration may be appropriately shortened. Therefore, the fast sleep mode may be enabled, so that the STA quickly enters the sleep state, to reduce power consumption.

S714. Whether the current application in the STA is not in the preset app list.

If the current application in the STA is in the preset app list, the STA does not enter the sleep state, or enters the sleep state after waiting for a relatively long time. In this case, the fast sleep mode does not need to be enabled, and the STA directly enters the sleep state by using the common sleep mode.

On the contrary, if the current application in the STA is not an application in the preset app list, the fast sleep mode may be enabled.

S716. Whether the AP is not in the preset AP list.

If the AP is in the preset AP list, the STA connected to the AP does not enter the sleep state, or enters the sleep state after waiting for a relatively long time, and the fast sleep mode does not need to be enabled. Otherwise, the fast sleep mode may be enabled.

S718. Enable the fast sleep mode.

In an embodiment, enabling the fast sleep mode means that the STA may enter the sleep state by using a relatively short waiting duration, for example, 60 ms. In this case, the STA may alternatively enter the sleep state by using 200 ms. For the STA, this is equivalent to an additional possibility.

In this case, a specific waiting duration to be used by the STA may be further determined based on at least one of the Wi-Fi service volume status, the signal strength status of the STA, the occupation status of the shared antenna, or the frequency band interference status.

In another embodiment, enabling the fast sleep mode means that the STA does not need to perform further determining, and may directly enter the sleep state by using 60 ms, and there is no longer a possibility of 200 ms. Correspondingly, when the fast sleep mode is disabled, the STA enters the sleep state by using 200 ms.

S720. Disable the fast sleep mode.

In this embodiment, if the fast sleep mode is disabled, the STA enters the sleep state by using 200 ms.

In a specific implementation scenario, if a determining result in any one of S708 to S716 is "no", subsequent determining may not be performed, and the fast sleep mode is directly disabled. If the determining result in any one of S708 to S716 is "no", and in this case, the fast sleep mode of the STA is just in a disabled state, the fast sleep mode does not need to be repeatedly disabled.

In addition to the type of the AP and the type of the current application in the STA, in this embodiment of this application, how the STA enters the sleep state may be further determined based on at least one of the Wi-Fi service volume status, the signal strength status of the STA, the occupation status of the shared antenna, or the frequency band interference status.

According to an aspect, the waiting duration of the STA may be determined based on a Wi-Fi service volume of the STA.

Figure 8:
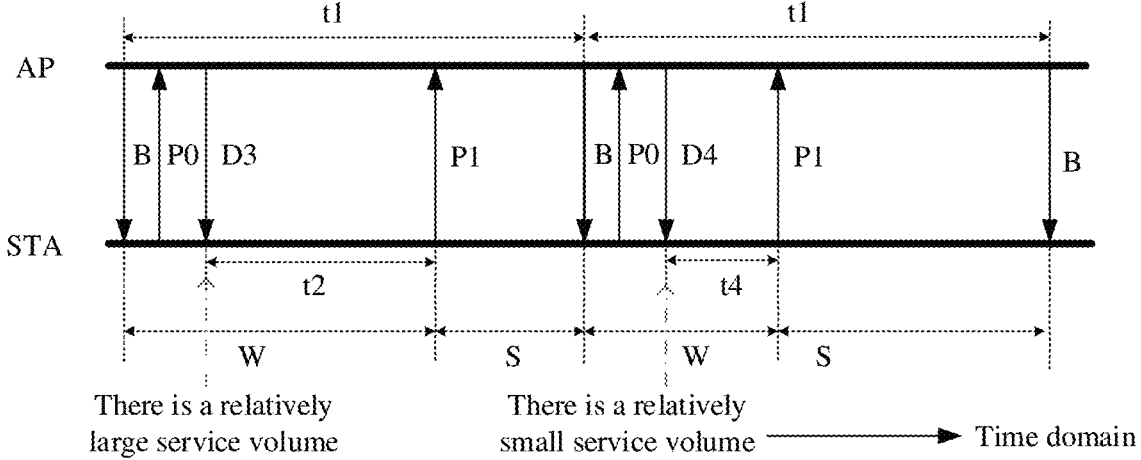
FIG. 8 is a schematic diagram of another data sending/receiving process of an electronic device according to an embodiment of this application.

For example, refer to FIG. 8. FIG. 8 shows another scenario in which the AP sends data to the STA.

In a first beacon period in FIG. 8, when listening to a beacon frame, the STA is in the wake state, and when determining, by listening to the beacon, that there is buffered data for the STA in the AP, sends PO, to notify the AP that the STA is currently in the wake state, and then the STA receives data D3 sent by the AP. In this case, there is a relatively large Wi-Fi service volume, data of a large quantity of services needs to be sent/received, and there may be a large amount of data that has a relatively high requirement on timeliness. In this case, the STA may enter the sleep state by using a relatively long waiting duration, to ensure real-time transfer of the services. That is, after the STA completes receiving of the data D3, the STA waits for a duration t2, for example, 200 ms, and if the STA does not send/receive other data in the duration t2, the STA sends P1, and changes from the wake state to the sleep state, and the Wi-Fi chip is powered off.

In a second beacon period in FIG. 8, the STA changes from the sleep state to the wake state, the Wi-Fi chip is powered on, and the STA has a sending/receiving capability. In this case, the STA may listen to a beacon frame broadcast by the AP, and when determining that there is buffered data for the STA in the AP, sends PO, to notify the AP that the STA is currently in the wake state, and then the STA receives data D4 sent by the AP. In this case, there is a relatively small Wi-Fi service volume for the STA, and the STA may perform sending/receiving with relatively high efficiency, and therefore may enter the sleep state by using a relatively short duration t4, for example, 60 ms. In this way, the STA may quickly enter the sleep state without posing excessive interference to an actual service.

In a possible embodiment, whether there is a relatively large Wi-Fi service volume may be determined based on a Wi-Fi throughput rate in the STA. A throughput rate of a Wi-Fi service in the STA may be obtained. If the throughput rate is less than a preset throughput threshold, it is determined that there is a relatively small Wi-Fi service volume. On the contrary, if the throughput rate of the Wi-Fi service is greater than or equal to the throughput threshold, it is determined that there is a relatively large Wi-Fi service volume. The throughput rate of the Wi-Fi service in the STA may be obtained by collecting statistics by the Wi-Fi chip. For example, the throughput threshold may be preset to 10 Mbps.

In another possible embodiment, whether there is a relatively large Wi-Fi service volume may be determined by using a quantity of packets sent/received in a unit time. That is, if the quantity of packets sent/received by the STA in the unit time is less than a preset quantity threshold, it is determined that there is a relatively small Wi-Fi service volume. On the contrary, if the quantity of packets sent/received by the STA in the unit time is greater than or equal to the preset quantity threshold, it is determined that there is a relatively large Wi-Fi service volume.

According to another aspect, the waiting duration to be used by the STA may be further determined based on signal strength of the STA.

Figure 9:
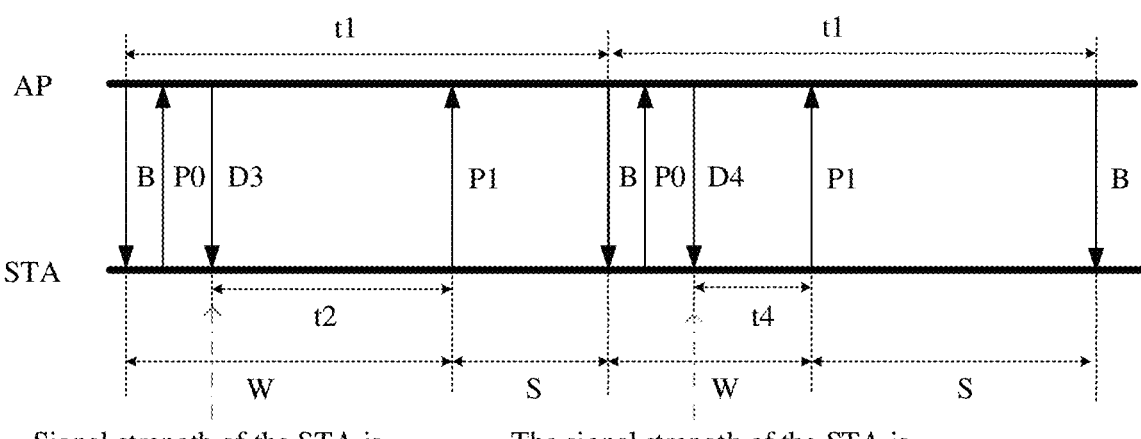
FIG. 9 is a schematic diagram of another data sending/receiving process of an electronic device according to an embodiment of this application.

For example, refer to FIG. 9. FIG. 9 shows another scenario in which the AP sends data to the STA.

In a first beacon period in FIG. 9, when listening to a beacon frame, the STA is in the wake state, and when determining, by listening to the beacon, that there is buffered data for the STA in the AP, sends P0, to notify the AP that the STA is currently in the wake state, and then the STA receives data D3 sent by the AP. In this case, if the signal strength of the STA is less than a preset strength threshold, there may be a relatively low rate of successfully sending/receiving a packet by the STA. In this case, the STA may enter the sleep state by using a relatively long waiting duration. That is, after the STA completes receiving of the data D3, the STA waits for a duration t2, for example, 200 ms, and if the STA does not send/receive other data in the duration t2, the STA sends P1, and changes from the wake state to the sleep state.

In a second beacon period in FIG. 9, the STA wakes up, and listens to a beacon frame in the wake state, and when determining, by using the beacon frame, that there is buffered data for the STA in the AP, the STA sends PO, to notify the AP that the STA is currently in the wake state. Then, the AP sends data D4, and the STA receives the data D4 sent by the AP. When transmission of the data D4 is completed, if the signal strength of the STA is greater than or equal to the preset strength threshold, there may be a relatively high rate of successfully sending/receiving a packet by the STA. In this case, the STA may enter the sleep state by using a relatively short waiting duration. That is, after the STA completes receiving of the data D4, the STA waits for a duration t4, for example, 60 ms, and if the STA does not send/receive other data in the duration t4, the STA sends P1, and changes from the wake state to the sleep state.

In this embodiment of this application, a signal of the STA may be specifically a received signal strength indicator (Received Signal Strength Indicator, RSSI). The data may also be obtained by collecting statistics by the Wi-Fi chip.

In a possible implementation scenario, if the Wi-Fi service and another service use a same antenna for communication, when a sleep mode to be used is considered, the occupation status of the shared antenna needs to be further considered. The another service may include but is not limited to at least one of a Bluetooth service and a ZigBee service. Description is provided herein by using Bluetooth as an example.

Figure 10:
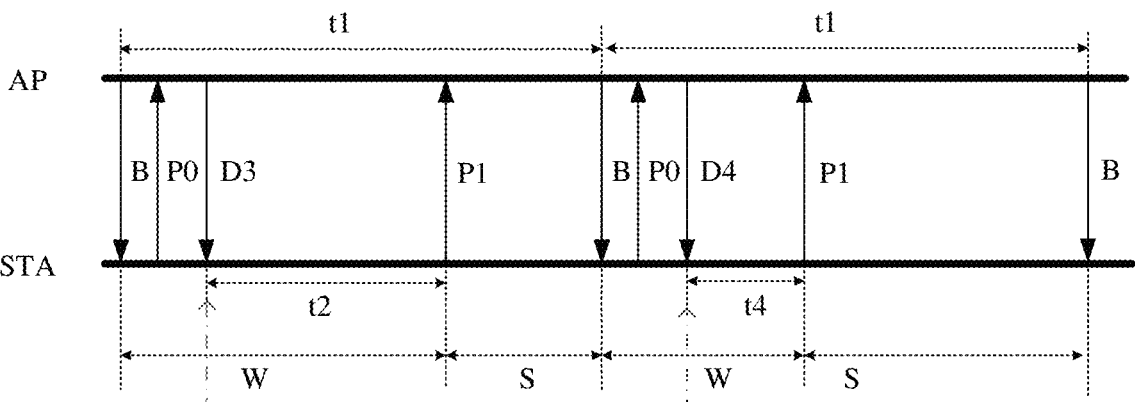
FIG. 10 is a schematic diagram of another data sending/receiving process of an electronic device according to an embodiment of this application.

FIG. 10 shows another scenario in which the AP sends data to the STA. In this scenario, the fast sleep mode is enabled for the STA, and there are the following two sleep modes based on the occupation status of the shared antenna:

In a first beacon period in FIG. 10, the STA listens to a beacon frame in the wake state, and when determining that there is buffered data for the STA in the AP, sends P0, to notify the AP that the STA is currently in the wake state, and then the STA receives data D3 sent by the AP. In this case, Bluetooth uses the shared antenna for data sending/receiving, and therefore there may be a relatively low rate of successfully sending/receiving data by the STA. In this case, the STA may enter the sleep state by using a relatively long waiting duration, and therefore enter the sleep state by using the common sleep mode. That is, after the STA completes receiving of the data D3, the STA waits for a duration t2, for example, 200 ms, and if the STA does not send/receive other data in the duration t2, the STA sends P1, and changes from the wake state to the sleep state.

In a second beacon period in FIG. 10, the STA listens to a beacon frame in the wake state, and when determining that there is buffered data for the STA in the AP, sends P0, to notify the AP that the STA is currently in the wake state, and then the STA receives data D4 sent by the AP. In this case, Bluetooth does not use the shared antenna, and therefore there may be a relatively high rate of successfully sending/receiving a packet by the STA. In this case, the STA may quickly enter the sleep state by using a relatively short waiting duration. That is, after the STA completes receiving of the data D4, the STA waits for a duration t4, for example, 60 ms, and if the STA does not send/receive other data in the duration t4, the STA sends P1, and changes from the wake state to the sleep state.

According to still another aspect, the sleep mode to be used may be further determined based on whether the signal of the STA receives signal interference.

Figure 11:
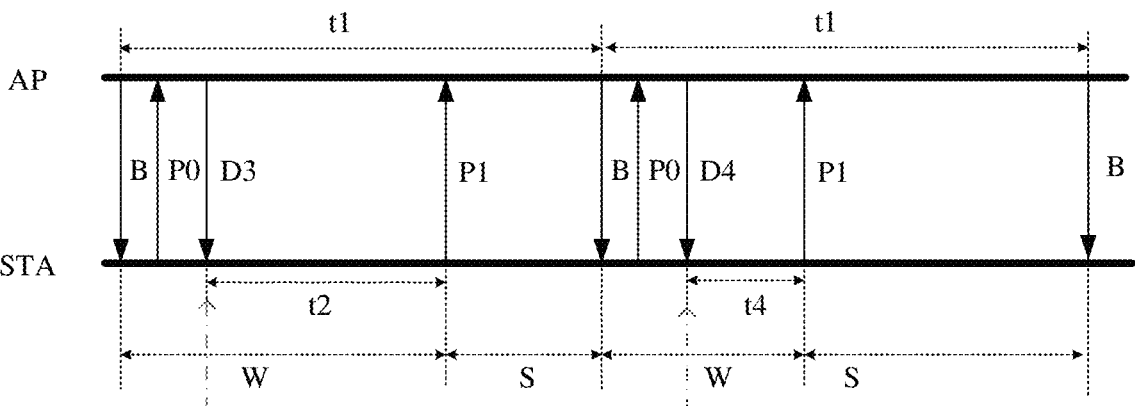
FIG. 11 is a schematic diagram of another data sending/receiving process of an electronic device according to an embodiment of this application.

For example, refer to FIG. 11. FIG. 11 shows another scenario in which the AP sends data to the STA. In this scenario, the fast sleep mode is enabled for the STA. Therefore, whether the signal of the STA is currently interfered with affects a signal sending/receiving success rate of the STA. There are the following two sleep modes:

In a first beacon period in FIG. 11, the STA listens to a beacon frame in the wake state, and when determining that there is buffered data for the STA in the AP, sends PO, to notify the AP that the STA is currently in the wake state, and then the STA receives data D3 sent by the AP. In this case, if the signal of the STA is interfered with by a frequency band, there may be a relatively low rate of successfully sending/receiving a packet by the STA. In this case, the STA may enter the sleep state by using a relatively long waiting duration. That is, after the STA completes receiving of the data D3, the STA waits for a duration t2, for example, 200 ms, and if the STA does not send/receive other data in the duration t2, the STA sends P1, and changes from the wake state to the sleep state.

In a second beacon period in FIG. 11, the STA listens to a beacon frame in the wake state, and when determining that there is buffered data for the STA in the AP, sends PO, to notify the AP that the STA is currently in the wake state, and then the STA receives data D4 sent by the AP. In this case, if the signal of the STA is not interfered with by a frequency band, there may be a relatively high rate of successfully sending/receiving a packet by the STA. In this case, the STA may quickly enter the sleep state by using a relatively short waiting duration. That is, after the STA completes receiving of the data D4, the STA waits for a duration t4, for example, 60 ms, and if the STA does not send/receive other data in the duration t4, the STA sends P1, and changes from the wake state to the sleep state.

In this embodiment of this application, signal interference received by the STA may include but is not limited to interference from an ISM band (Industrial Scientific Medical Band). The ISM band is a frequency band that is mainly open to industrial (Industrial), scientific (Scientific), and medical (Medical) institutions in countries. The ISM band is not uniformly specified in the countries, but 2.4 GHz is an ISM band common in the countries. All wireless networks such as a wireless local area network (IEEE 802.11b/IEEE 802.11g), Bluetooth, and ZigBee may work at the frequency band of 2.4 GHz. Therefore, the ISM frequency band may interfere with a data transmission process between the STA and the AP.

In this embodiment of this application, the foregoing implementations may be independently performed without considering other embodiments. For example, regardless of the type of the AP and the type of the current application in the STA, the STA enters the sleep state by using a relatively long waiting duration of 200 ms provided that there is a relatively large service volume for the STA. On the contrary, there is a relatively small service volume for the STA, the STA enters the sleep state by using 60 ms.

In another embodiment of this application, the foregoing implementations may be combined to determine the waiting duration. For example, regardless of the type of the AP and the type of the current application in the STA, if at least one of the following cases, namely, cases in which there is a relatively large service volume for the STA, the signal strength of the STA is relatively low, the shared antenna is occupied, and there is frequency band interference, occurs, the STA enters the sleep state by using 200 ms. If none of the cases occurs, the STA enters the sleep state by using 60 ms. For another example, if at least one of the following cases, namely, cases in which the AP is a first AP, the current application in the STA is a first application, there is a relatively large service volume for the STA, the signal strength of the STA is relatively low, the shared antenna is occupied, and there is frequency band interference, occurs, the STA enters the sleep state by using 200 ms. If none of the cases occurs, the STA enters the sleep state by using 60 ms.

In still another embodiment of this application, whether to enable the fast sleep mode may be further determined in advance based on the type of the AP and the current application in the STA. After the fast sleep mode is enabled, determining of at least one of conditions shown in FIG. 8 to FIG. 11 is subsequently performed, and then the waiting duration for entering the sleep state by the STA is determined based on a determining result.

In an embodiment, if it is determined, after determining shown in FIG. 7 is performed, that the fast sleep mode is enabled (S718), the STA may enter the sleep state by using a sleep mode of 60 ms or a sleep mode of 200 ms. In this case, determining is further performed based on at least one of the conditions in FIG. 8 to FIG. 11. For example, if there is a relatively large service volume for the STA, the STA enters the sleep state by using 200 ms. If there is a relatively small service volume for the STA, the STA enters the sleep state by using 60 ms. For another example, if at least one of the following cases, namely, cases in which there is a relatively large service volume for the STA, the signal strength of the STA is relatively low, the shared antenna is occupied, and there is frequency band interference, occurs, the STA enters the sleep state by using 200 ms. If none of the cases occurs, the STA enters the sleep state by using 60 ms.

In another embodiment, if it is determined, after determining shown in FIG. 7 is performed, that the fast sleep mode is enabled (S718), the STA may enter the sleep state by using a sleep mode of 60 ms. In this case, determining is further performed based on at least one of the conditions in FIG. 8 to FIG. 11, to determine whether to enter the sleep state by using a waiting duration of 60 ms. For example, if there is a relatively large service volume for the STA, the fast sleep mode may be disabled, and the STA enters the sleep state by using 200 ms corresponding to the common sleep mode. If there is a relatively small service volume for the STA, the STA enters the sleep state by using 60 ms. For another example, if at least one of the following cases, namely, cases in which there is a relatively large service volume for the STA, the signal strength of the STA is relatively low, the shared antenna is occupied, and there is frequency band interference, occurs, the fast sleep mode is disabled, and the STA enters the sleep state by using 200 ms. If none of the cases occurs, the STA enters the sleep state by using 60 ms corresponding to the fast sleep mode.

In another embodiment, if it is determined, after determining shown in FIG. 7 is performed, that the fast sleep mode is disabled (S720), the STA may enter the sleep state by using a sleep mode of 200 ms, or may not enter the sleep state. In this case, determining is further performed based on at least one of the conditions in FIG. 8 to FIG. 11, to determine whether the STA is to enter the sleep state. For example, if there is a relatively large service volume for the STA, the STA may not enter the sleep state. If there is a relatively small service volume for the STA, the STA may enter the sleep state by using 200 ms. For another example, if at least one of the following cases, namely, cases in which there is a relatively large service volume for the STA, the signal strength of the STA is relatively low, the shared antenna is occupied, and there is frequency band interference, occurs, the STA may not enter the sleep state. If none of the cases occurs, the STA may enter the sleep state by using a relatively long waiting duration of 200 ms.

In addition, when there is no buffered data for the STA in the AP, the STA may enter the sleep state after waiting for a duration t3. In another possible embodiment, regardless of whether there is buffered data for the STA in the AP, after waking up, the STA may notify the AP that the STA is in the wake state (by sending PO), and then waits for a duration, and if no data is sent/received, sends P1, and enters the sleep state.

In this case, if the fast sleep mode is enabled for the STA, whether to quickly enter the sleep state may be determined based on at least one of the service volume of the STA, the signal strength, the occupation status of the shared antenna, or the interference status. Details are not described.

In the communication scenarios shown in FIG. 3 to FIG. 11, the STA may wake up when receiving the beacon frame sent by the AP. In this way, when establishing an association with the AP to access the wireless network, the STA may obtain an interval at which the AP sends the beacon frame.

Figure 12:
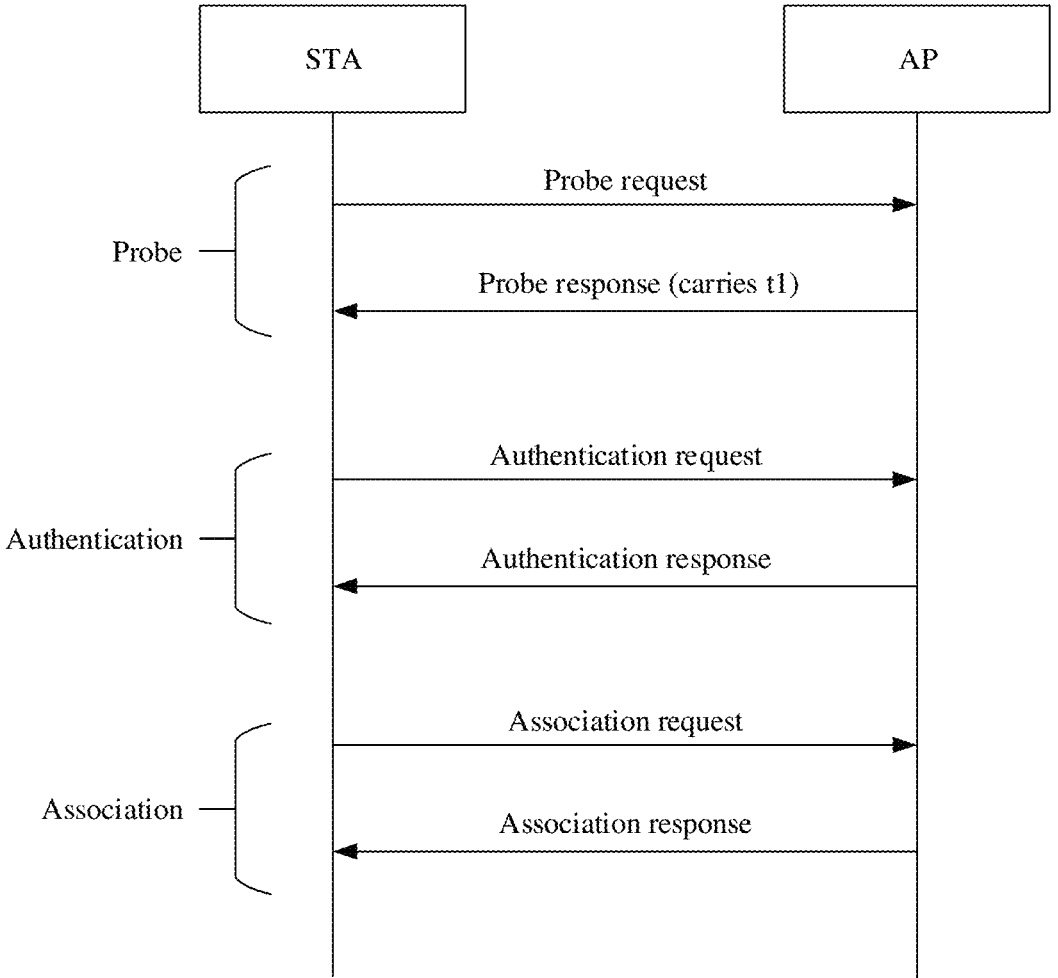
FIG. 12 is a schematic diagram of a process in which an electronic device accesses a wireless network according to an embodiment of this application.

FIG. 12 is a schematic diagram of a process in which the STA accesses the wireless network. As shown in FIG. 12, after a wireless communication function of the STA is enabled, the STA may automatically scan a nearby AP. The STA may send a probe request (Probe Request) to a scanned AP. After receiving the probe request, the AP sends a probe response (Probe Response) to the STA. The probe response carries some information about the AP, for example, a period duration t1 in which the AP sends the beacon frame and that is shown in FIG. 12. Then, the STA requests authentication from the AP. As shown in FIG. 12, the STA sends an authentication request (Authentication Request) to the AP. The AP may request, based on the authentication request, an authentication server (Authentication Server) to authenticate the STA, and send an authentication response (Authentication Response) to the STA after authentication succeeds. After the STA receives the authentication response, the STA establishes an association with the AP. As shown in FIG. 12, the STA sends an association request (Association Request) to the AP, and receives an association response (Association Response) fed back by the AP. In this way, the association between the AP and the STA is completed, and the STA may access the wireless network by using the AP.

It may be learned from FIG. 12 that when the STA establishes an association with the AP, which is specifically that when the STA receives the probe response sent by the AP, the STA may obtain a transmission period of the beacon, so that the STA can wake up when the AP sends the beacon frame. In other words, setting may be performed in the STA, so that the STA wakes up when the AP sends the beacon frame.

Figure 13:
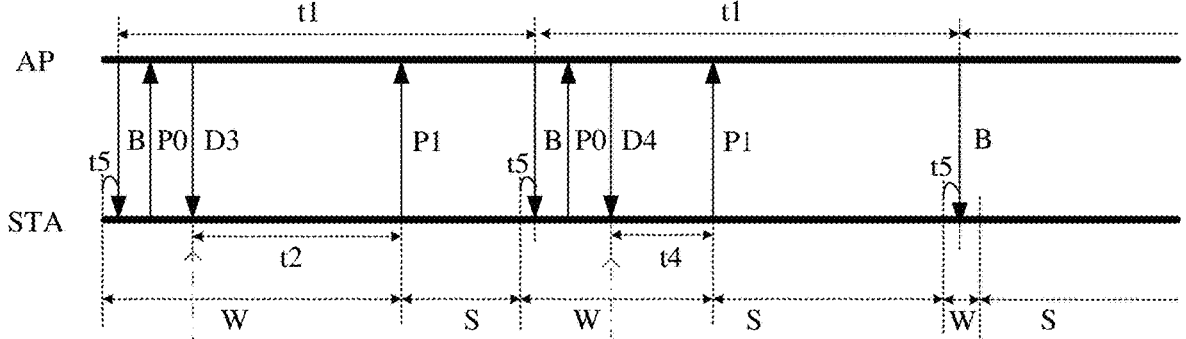
FIG. 13 is a schematic diagram of another data sending/ receiving process of an electronic device according to an embodiment of this application.
Figure 13:

FIG. 13 shows another scenario in which the AP sends data to the STA. As shown in FIG. 13, before the AP sends the beacon frame, the STA wakes up a duration t5 earlier.

In a first beacon period shown in FIG. 13, the STA wakes up before listening to a beacon frame, and is in the wake state. The beacon frame indicates that there is buffered data for the STA in the AP, and therefore the STA sends PO to the AP, to notify the AP that the STA is currently in the wake state. Therefore, the AP sends data D3 to the STA, and the STA receives the data D3. After receiving of the data D3 is completed, if Bluetooth currently uses the antenna shared with Wi-Fi, there may be a relatively low rate of successfully sending a packet by the STA. In this case, the STA may wait for a duration t2, and if determining that no data is sent/received, sends P1 to the AP, where P1 is used to notify the AP that the STA is about to enter the sleep state, and then enters the sleep state. In other words, in the first beacon period, the STA enters the sleep state by using the common sleep mode.

In a second beacon period shown in FIG. 13, the STA still wakes up before listening to a beacon frame, and is in the wake state. After listening to the beacon frame, the STA sends PO to the AP, and receives data D4 sent by the AP. When the STA completes receiving of the data D4, if Bluetooth does not use the shared antenna in this case, the STA may enter the sleep state by using the fast sleep mode, that is, enter the sleep state by using a duration t4. A process is not described.

In a third beacon period shown in FIG. 13, the STA still wakes up early before listening to a beacon frame, and after listening to the beacon frame, if it is determined that there is no buffered data for the STA in the AP, and the STA does not need to send data, the STA may quickly enter the sleep state after listening to the beacon frame.

In other words, in this embodiment of this application, the STA may wake up before listening to the beacon frame, or may wake up at a moment at which the AP sends the beacon frame, to listen to content in the beacon frame, so that when there is buffered data in the AP, the STA may receive the data in a timely manner, to ensure smooth running of a service.

Figure 14:
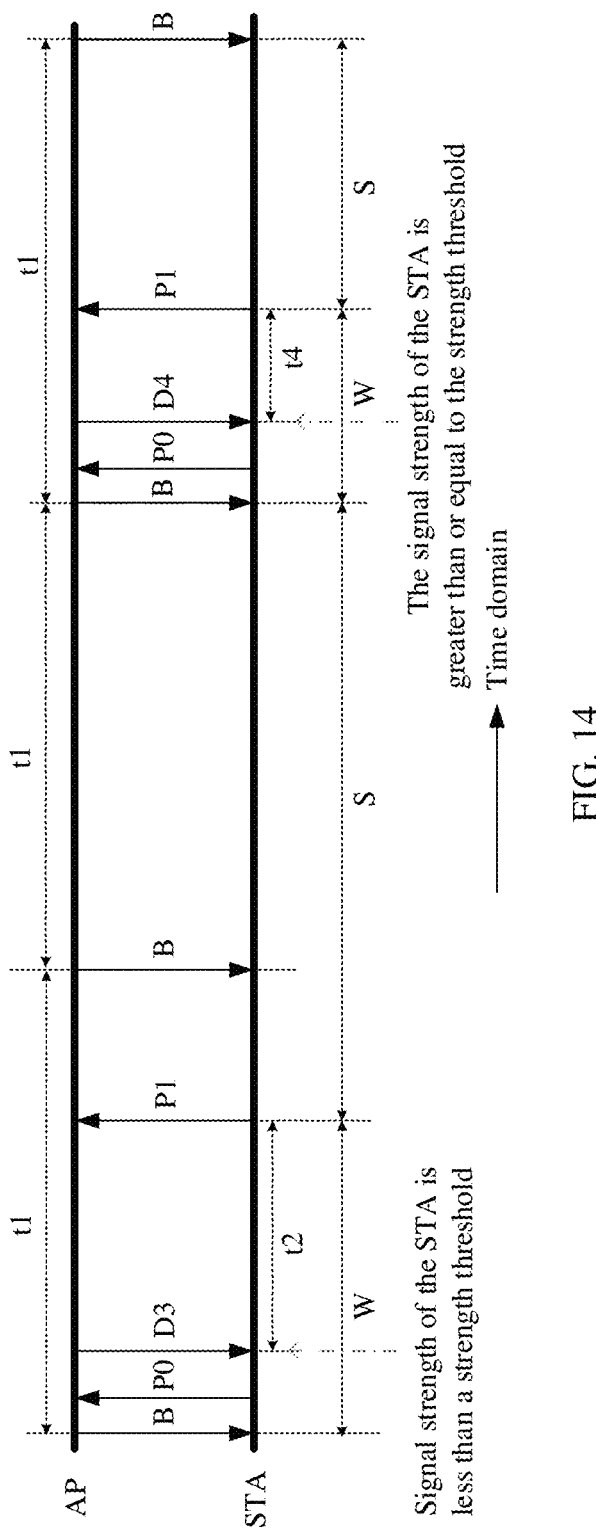
FIG. 14 is a schematic diagram of another data sending/ receiving process of an electronic device according to an embodiment of this application.

In another possible embodiment, the STA may determine, based on the duration t1, a moment at which the AP sends the beacon frame. Therefore, in addition to the implementations shown in FIG. 3 to FIG. 13, the STA may be configured not to wake up in some beacon periods. For example, FIG. 14 shows another scenario in which the AP sends data to the STA. In this scenario, a case in which the STA is continuously in the sleep state in a second beacon period is shown.

In a first beacon period shown in FIG. 14, the STA wakes up when receiving a beacon frame. The beacon frame indicates that there is buffered data for the STA in the AP. In this case, after sending PO to the AP, the STA receives data D3 sent by the AP. When receiving of the data D3 is completed, the signal strength of the STA is relatively low, and therefore the STA enters the sleep state based on a duration t2, in other words, enters the sleep state based on the common sleep mode.

The STA enters the sleep state in the first beacon period, and the STA changes from the sleep state to the wake state until the AP sends a third beacon frame. In other words, the STA skips a second beacon frame sent by the AP, does not wake up, and is continuously in the sleep state. In this case, the second beacon frame may indicate that there is buffered data for the STA in the AP, or the second beacon frame may indicate that there is no buffered data for the STA in the AP. In a process in which the STA is in the sleep state, if the AP needs to forward data to the STA, the AP buffers the data for the STA until the STA wakes up and sends PO to the AP, and then the AP sends the buffered data to the STA.

In a third beacon period shown in FIG. 14, after waking up, the STA listens to a beacon frame, sends PO to the AP, and receives data D4 sent by the AP. In this case, the data D4 may include data buffered for the STA in a previous time period in which the STA is in the sleep state, and may further include data that needs to be sent to the STA from a moment at which the STA wakes up in the third beacon period to a current moment. After the STA completes receiving of the data D4, the STA quickly enters the sleep state based on a duration t4 because the signal strength of the STA is relatively high.

In an actual scenario, the STA may wake up and enter the sleep state in N consecutive beacon periods, then is continuously in the sleep state in M consecutive beacon periods, and then wakes up again in an $(N+M+1)^{th}$ beacon period, and repeats the foregoing process. Values of N and M may be preset as required.

For example, as shown in FIG. 14, the STA may wake up and enter the sleep state in a beacon period, then is continuously in the sleep state at an interval of one beacon period, and then wakes up in a next beacon period. For another example, the STA may wake up and enter the sleep state in first to third beacon periods, then is continuously in the sleep state in a fourth beacon period, and then wakes up again in a fifth beacon period. By analogy, the STA wakes up and enters the sleep state in the fifth beacon period to a seventh beacon period, is continuously in the sleep state in an eighth beacon period, and so on. Details are not described.

In this embodiment of this application, regardless of a manner used by the STA to be in the wake state, after the STA is in the wake state and completes data transmission, the STA may enter the sleep state by selecting different sleep modes based on the foregoing manner and based on an actual communication scenario.

Figure 15:
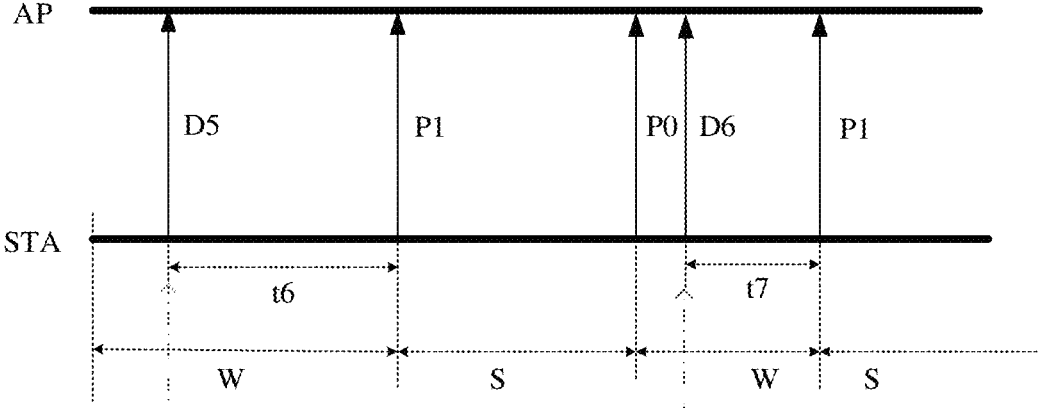
FIG. 15 is a schematic diagram of another data sending/ receiving process of an electronic device according to an embodiment of this application.

In addition to the scenario in which the AP sends data to the STA, in this embodiment of this application, there is also a scenario in which the STA actively sends data to the AP. For example, refer to FIG. 15. FIG. 15 is a scenario in which the STA sends data to the AP.

When the STA is in the wake state, the STA may directly send data D5 to the AP. After transmitting the data D5, the STA may enter the sleep state by using a relatively long duration t6 if the STA detects that there is currently frequency band interference. That is, the STA may wait for the duration t6, and if the STA does not send/receive data in the duration t6, the STA sends P1 to the AP, and then enters the sleep state. After receiving P1, the AP may know that the STA enters the sleep state.

After the STA enters the sleep state for a time period, if the STA needs to send data to the AP, the STA wakes up, and changes from the sleep state to the wake state. After waking up, the STA may send PO and data D6. After transmitting the data D6, the STA may quickly enter the sleep state by using a relatively short duration t7 if the STA detects that there is currently no frequency band interference. That is, the STA may wait for the duration t7, and if the STA does not send/receive data in the duration t7, the STA sends P1 to the AP, and then enters the sleep state.

When needing to send uplink data, the STA changes from the sleep state to the wake state. For example, in an implementation scenario, when the STA needs to send uplink data, a processor of the STA may send a data sending instruction to a wireless communications module, so that the wireless communications module is powered on and works when receiving the data sending instruction. For another example, when the STA needs to send uplink data, a processor of the STA may directly send the to-be-sent uplink data to a wireless communications module, so that after receiving the uplink data, the wireless communications module is powered on, and sends the uplink data.

As shown in FIG. 15, the duration t6 is greater than the duration t7. In a possible implementation scenario, a common sleep mode and a fast sleep mode are preset. In this case, in the common sleep mode, a waiting duration that exists after the STA receives data may be t2, and a waiting duration that exists after the STA sends data may be t6. In a specific implementation scenario, the duration t6 may be the same as or different from the duration t2. Similarly, in the fast sleep mode, a waiting duration that exists after the STA receives data may be t4, and a waiting duration that exists after the STA sends data may be t7. The duration t7 may be the same as or different from the duration t4. In other words, the fast sleep mode in a scenario in which the STA sends data may be the same as or different from the fast sleep mode in a scenario in which the STA receives data, and the common sleep mode in the scenario in which the STA sends data may be the same as or different from the common sleep mode in the scenario in which the STA receives data.

In this embodiment of this application, after waking up, the STA may separately send PO and the data D6. Alternatively, after waking up, the STA may send the data D6. The data D6 may carry PO, or the data D6 carries indication information, in PO, indicating that the STA in the wake state. Alternatively, after waking up, the STA may send only the data D6. In this case, the STA may no longer send, to the AP, indication information indicating that the STA is in the wake state, and after receiving the data D6, the AP may determine that the STA is in the wake state.

In the scenario in which the STA actively sends data to the AP, the STA may also use different sleep modes based on the manners shown in FIG. 3 to FIG. 14 and an actual communication scenario. For example, whether to enable the fast sleep mode may be determined based on the manner shown in FIG. 7. For another example, after the fast sleep mode is enabled, the waiting duration to be used in each beacon period may be determined based on the manner shown in any of embodiments in FIG. 8 to FIG. 11. For another example, an occasion on which the STA wakes up may be controlled based on the manner shown in FIG. 13 or FIG. 14.

In a data exchange scenario between the STA and the AP, there is usually a case in which the STA sends data to the AP, and there is also a case in which the STA receives data sent by the AP. In this case, in addition to waking up when listening to the beacon frame, the STA may wake up when sending data.

Figure 16A:
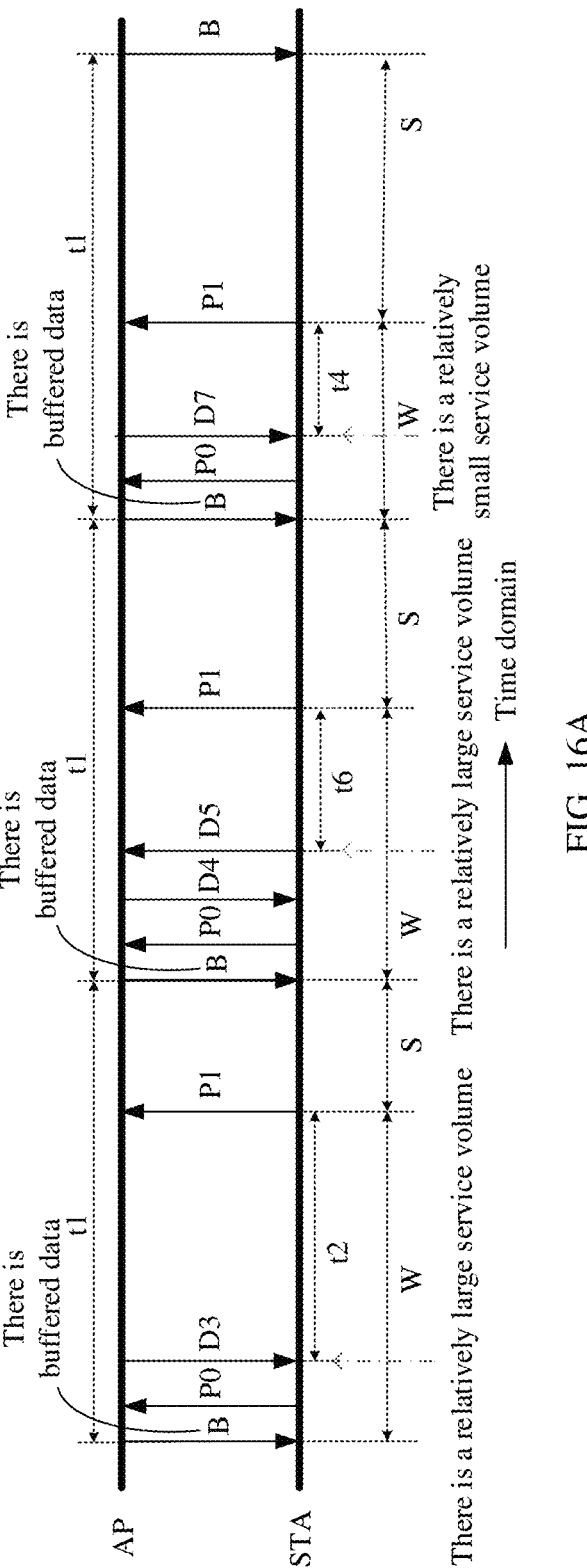
FIG. 16A is a schematic diagram of another data sending/ receiving process of an electronic device according to an embodiment of this application.

For example, refer to FIG. 16A. In a first beacon period in FIG. 16A, the STA also wakes up based on a duration t1, and listens to a first beacon frame sent by the AP, and the beacon frame indicates that there is buffered data for the STA in the AP, and therefore the STA sends PO, to indicate that the STA is in the wake state. After receiving PO, the AP sends data D3 to the STA. When the STA completes receiving of the data D3, the STA may wait for a duration t2 because there is a relatively large service volume for the STA, and send P1 to the AP if no data is sent/received, and then the STA enters the sleep state. In a second beacon period in FIG. 16A, the STA wakes up, enters the wake state, and starts to listen to a second beacon frame sent by the AP. The STA sends PO to the AP, and receives data D4 sent by the AP. In addition, the STA may actively send data to the AP in the wake state. As shown in FIG. 16A, after the STA completes receiving of the data D4 (for example, there may be that when or before the STA completes receiving of the data D4), the STA may further actively send data D5 to the AP. After the STA completes transmission of the data D5, the STA may wait for a duration t6 because for the STA, there is a relatively large service volume of sending/receiving data, and if no data is sent/received, the STA sends P1 to the AP, and enters the sleep state. In a third beacon period in FIG. 16A, the STA wakes up when listening to a beacon frame, sends PO to the AP, and then receives data D7 buffered by the AP for the STA. After receiving of the data D7 is completed, because there is currently a relatively small service volume for the STA, the STA may send P1 after a duration t4, and then enter the sleep state again.

Figure 16B:
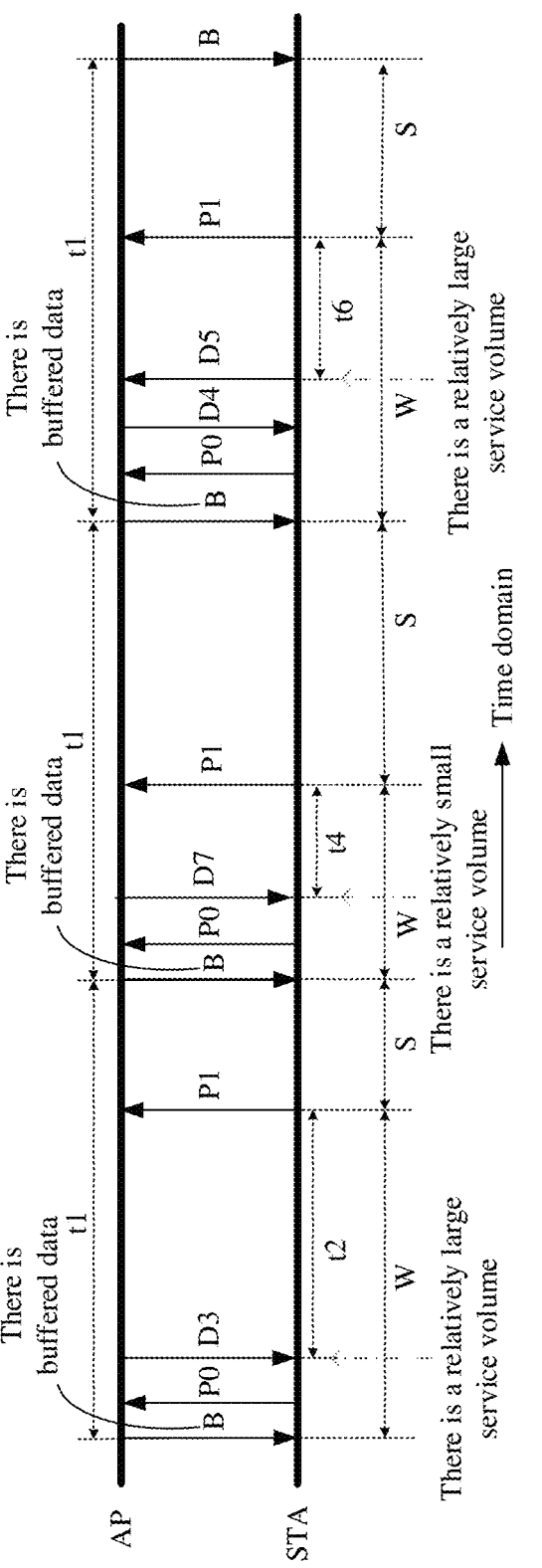
FIG. 16B is a schematic diagram of another data sending/ receiving process of an electronic device according to an embodiment of this application.

For example, reference may be further made to FIG. 16B. In a first beacon period shown in FIG. 16B, the STA receives data D3. There is currently a relatively large service volume, and therefore if no data is sent/received after a duration t2, the STA enters the sleep state. In a second beacon period, the STA wakes up, listens to a beacon frame, sends P0, and receives data D7. There is currently a relatively small service volume, and therefore if the STA does not send/receive data after a duration t4, the STA enters the sleep state. In a third beacon period, the STA wakes up, listens to a beacon, and sends data D5 to the AP after receiving data D4. There is currently a relatively large service volume, and therefore if no data is sent/received after the STA waits for a duration t6, the STA enters the sleep state again.

Figure 16C:
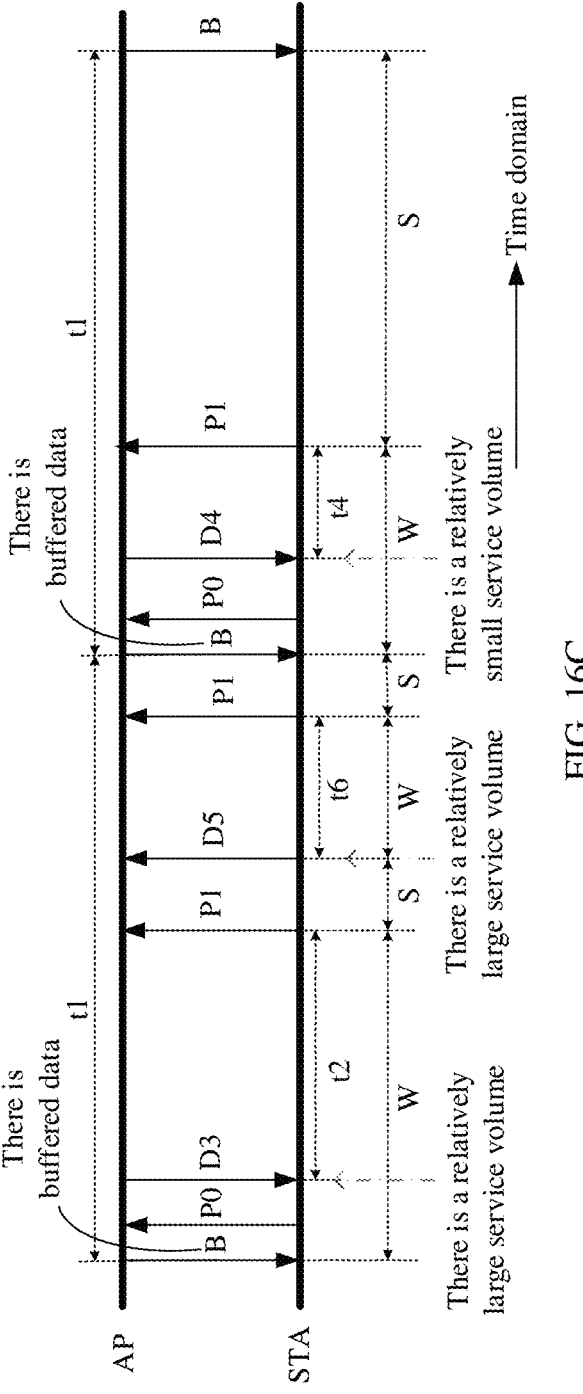
FIG. 16C is a schematic diagram of another data sending/ receiving process of an electronic device according to an embodiment of this application.

For example, reference may be further made to FIG. 16C. In a first beacon period shown in FIG. 16C, the STA receives data D3. There is currently a relatively large service volume, and therefore if no data is sent/received after a duration t2, the STA enters the sleep state. In the beacon period, after a duration, the STA needs to actively send data to the AP. For example, when a wireless communications module receives a data sending instruction sent by a processor, the STA wakes up, and sends data D5 to the AP. In this case, there is a relatively large service volume, and therefore after waiting for a duration t6, the STA sends P1, and enters the sleep state again. The STA wakes up when listening to a second beacon frame, receives data D4, and then enters the sleep state again after a duration t4.

In other words, the STA may wake up when listening to the beacon frame (at the sending moment or before the sending moment), or may wake up when actively sending uplink data. In this embodiment of this application, whether there are the two times of wakeup in one beacon period is not limited. This depends on an actual communication process.

In addition, when in the wake state, the STA may receive and/or send data. In this embodiment of this application, a quantity of pieces of downlink data received by the STA and a quantity of pieces of uplink data sent by the STA in one beacon period are not limited. Based on this, the STA may determine a start point of the waiting duration by using different policies.

Figure 17A:
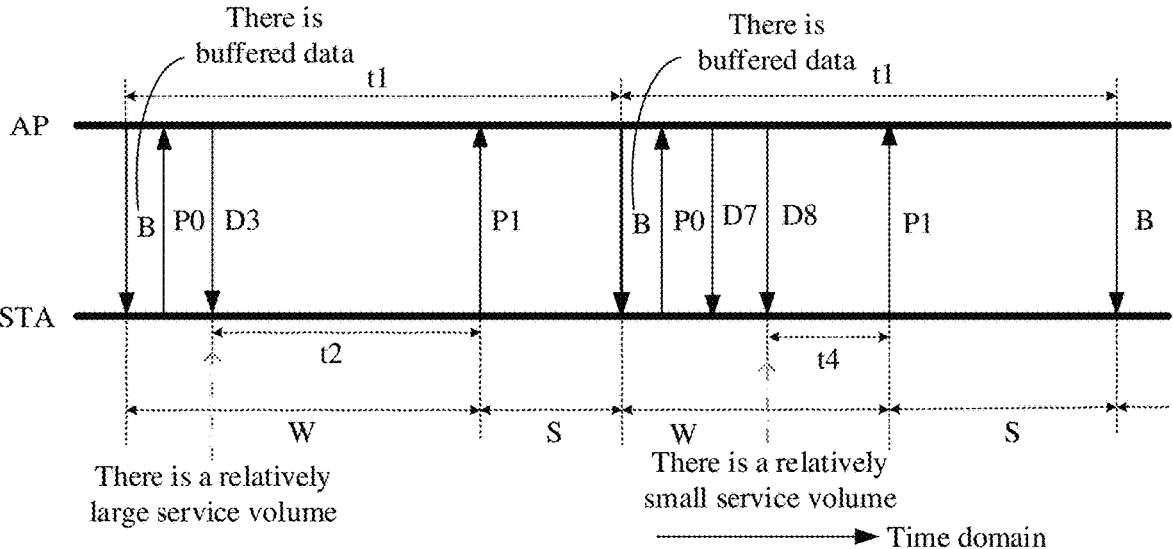
FIG. 17A is a schematic diagram of another data sending/ receiving process of an electronic device according to an embodiment of this application.
Figure 17B:
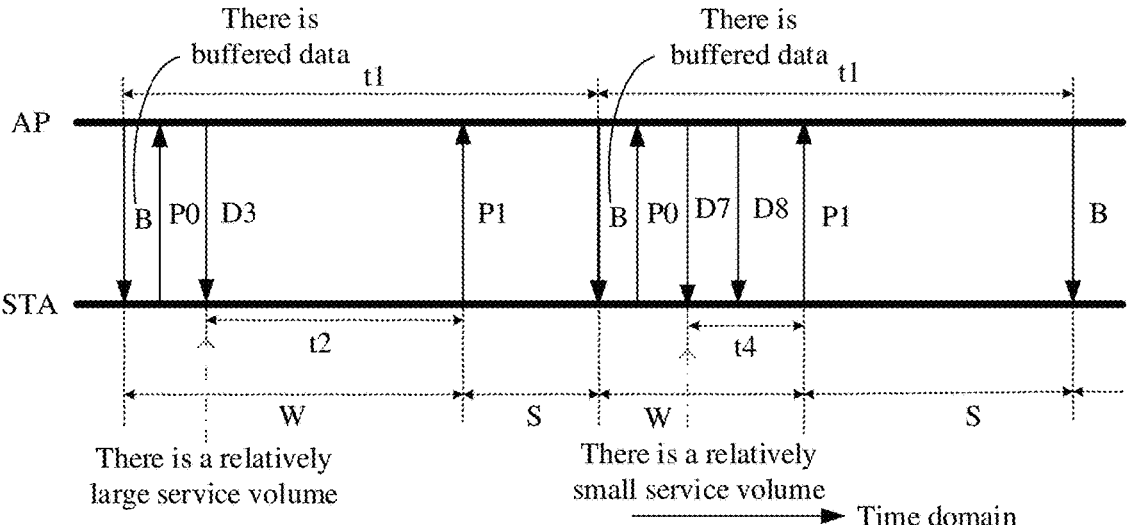
FIG. 17B is a schematic diagram of another data sending/ receiving process of an electronic device according to an embodiment of this application.

For example, refer to scenarios shown in FIG. 17A and FIG. 17B. In this example embodiment, in a first beacon period, the STA receives data D3, then waits for a duration t2 because there is currently a relatively large service volume, and then enters the sleep state. In a second beacon period, the STA sequentially receives data D7 and data D8 sent by the AP. In this case, the STA may enter the sleep state by using different policies.

In a design, as shown in FIG. 17A, the STA uses a moment at which receiving of most recently received data is completed as the timing start point of the waiting duration. As shown in FIG. 17A, when completing receiving of the data D8, the STA starts timing, and the STA enters the sleep state after waiting for a duration t4. In this case, if new data is received in the duration t4, the STA uses a moment at which receiving of the newly received data is completed as a new timing start point, and starts timing again.

In another design, as shown in FIG. 17B, the STA uses a moment at which receiving of data first received by the STA in the wake state is completed as the timing start point of the waiting duration. As shown in FIG. 17B, the data first received by the STA after waking up is the data D7. In this case, the STA starts timing by using a moment at which receiving of the data D7 is completed as the timing start point of the waiting duration, and enters the sleep state when a timing end point is reached. In this implementation scenario, even if the STA sends/receives other data in this process that lasts for the waiting duration, the timing start point is no longer determined again.

A similar design may be used in the case of data receiving. Refer to scenarios shown in FIG. 17C and FIG. 17D.

Figure 17C:
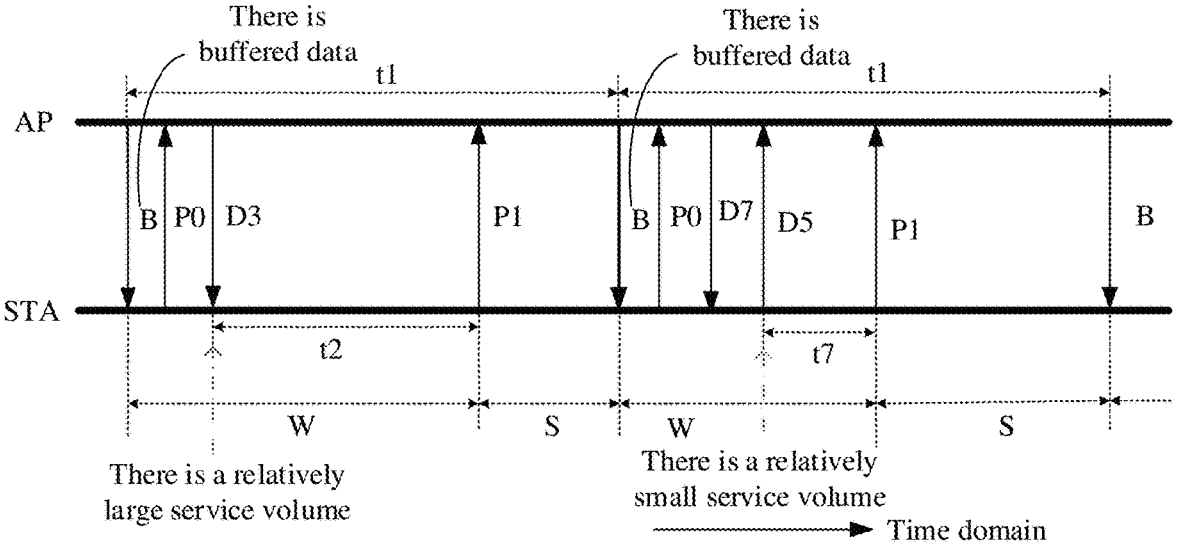
FIG. 17C is a schematic diagram of another data sending/ receiving process of an electronic device according to an embodiment of this application.

In another design, refer to FIG. 17C. In a second beacon period in an embodiment shown in FIG. 17C, the STA receives data D7, and then sends data D5 to the AP. In this case, the STA may use a moment at which sending/receiving of data most recently sent/received is completed as the timing start point. Therefore, after completing sending of the data D5, the STA enters the sleep state after waiting for a duration t7.

Figure 17D:
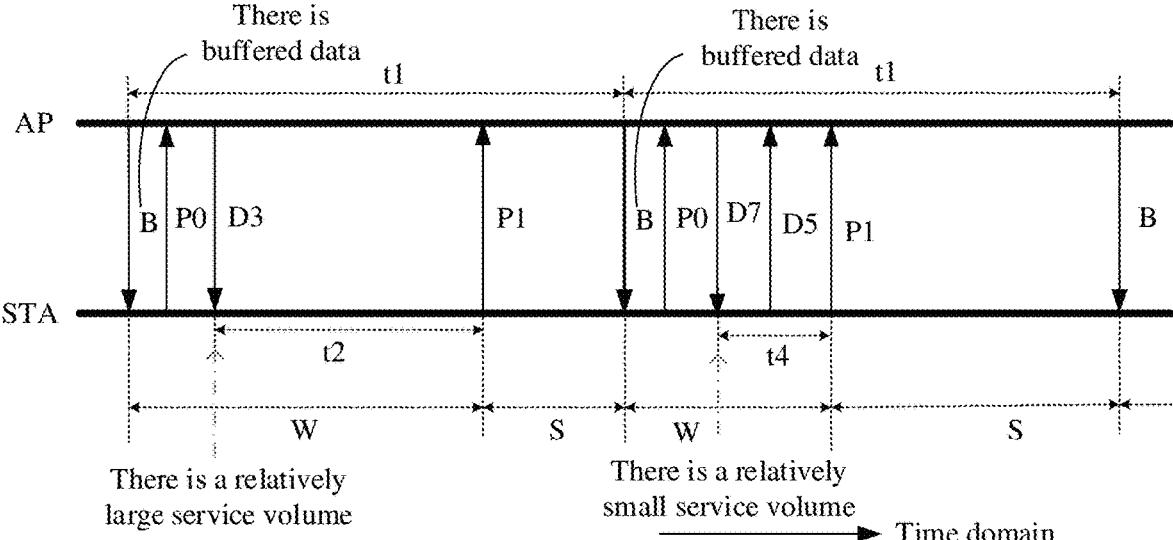
FIG. 17D is a schematic diagram of another data sending/ receiving process of an electronic device according to an embodiment of this application.

In another design, refer to FIG. 17D. In a second beacon period in an embodiment shown in FIG. 17D, data first received by the STA after waking up is data D7. In this case, the STA may start timing by using a moment at which receiving of the data D7 is completed as the timing start point of the waiting duration, and enter the sleep state when a duration t4 is reached. In this implementation scenario, even if the STA sends/receives other data in this process that lasts for the waiting duration, the timing start point is no longer determined again.

In addition, there may be further a limitation that the STA determines the waiting duration only based on received data, or determines the waiting duration only based on data that is sent. For example, in a scenario shown in FIG. 17D, the STA may use a moment at which receiving of most recently received data is completed as the timing start point of the waiting duration. In this way, even if the STA sends data D5 after receiving data D7, the STA also starts timing for the waiting duration based on a moment at which receiving of the data D7 is completed.

When there is a case of data receiving and sending, the sleep delay policy and the early wakeup manner are still applicable. In this case, refer to FIG. 18A and FIG. 18B.

Figure 18A:
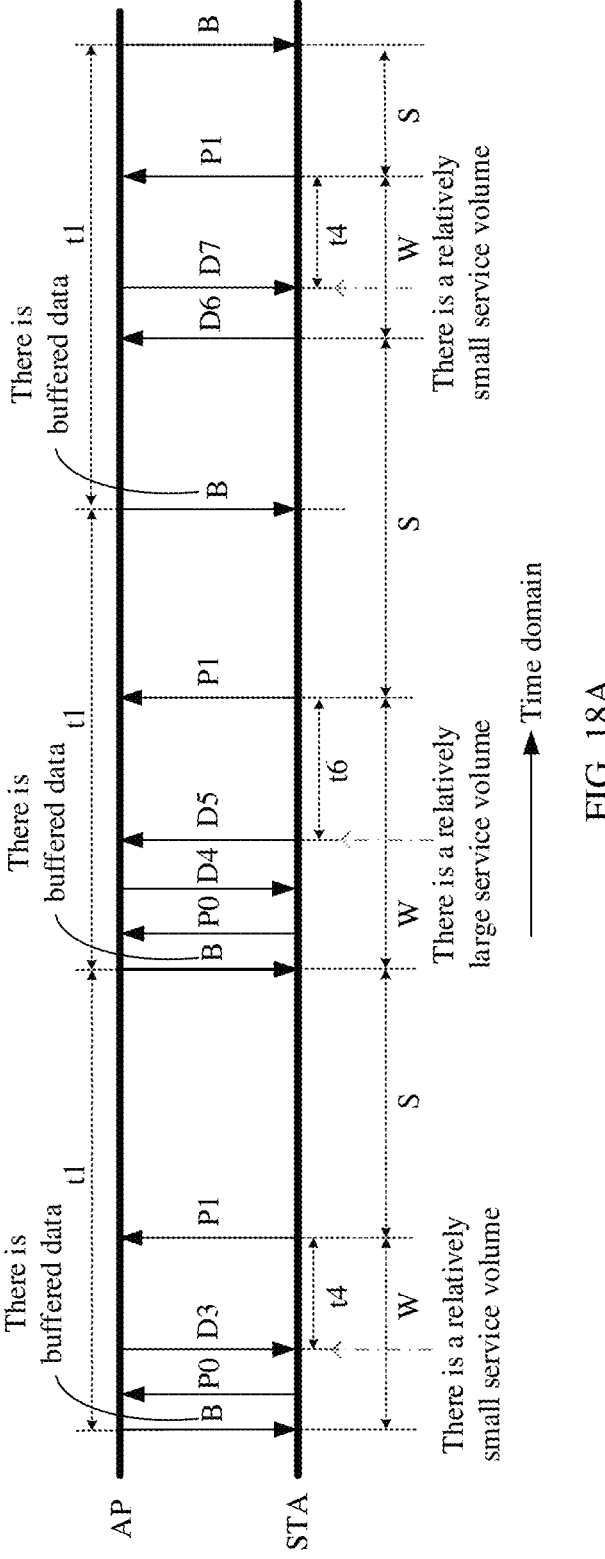
FIG. 18A is a schematic diagram of another data sending/ receiving process of an electronic device according to an embodiment of this application.

In an example embodiment, as shown in FIG. 18A, in a first beacon period, the STA wakes up based on a duration t1. After waking up, the STA listens to a first beacon frame sent by the AP, and the STA sends P0 because the beacon frame indicates that there is buffered data for the STA in the AP, to indicate that the STA is in the wake state. After receiving PO, the AP sends data D3 to the STA. When the STA completes receiving of the data D3, the STA may wait for a duration t4 because there is a relatively small service volume for the STA, and send P1 to the AP if no data is sent/received, and then the STA enters the sleep state.

The STA enters the sleep state at a sending moment of a second beacon frame, and does not wake up when the AP sends a third beacon frame. In this case, in a third beacon period, the AP does not receive PO sent by the STA. Therefore, the AP determines that the STA is still in the sleep state. In this case, if there is data that needs to be forwarded to the STA, the AP buffers the data for the STA, and the AP sends the buffered data to the STA only after receiving PO or other data sent by the STA.

In the third beacon period shown in FIG. 18A, the STA needs to actively send data D6 to the AP. In this case, the STA switches from the sleep state to the wake state, the Wi-Fi chip and another wireless communications device are powered on and work, and the STA sends the data D6 to the AP. After receiving the data D6, the AP may determine that the STA is in the wake state, and then the AP may send data D7 buffered for the STA to the STA. The STA receives the data D7. When receiving is completed, the STA may enter the sleep state by using a relatively short waiting duration t4 because there is a relatively small service volume for the STA. That is, after the waiting duration t4, if no data is sent/received, the STA sends P1 to the AP gain, and enters the sleep state.

Figure 18B:
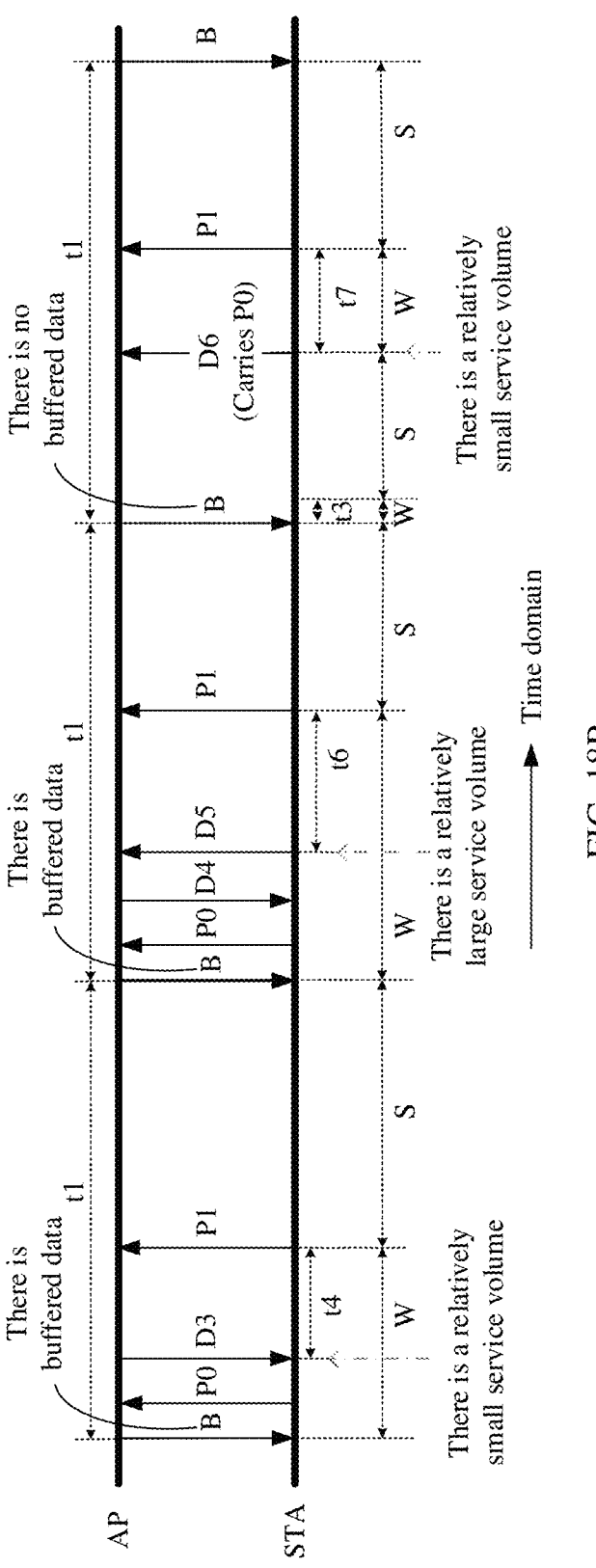
FIG. 18B is a schematic diagram of another data sending/ receiving process of an electronic device according to an embodiment of this application.

For example, FIG. 18B shows another embodiment. In this embodiment, cases in first two beacon periods are the same as those in FIG. 18A. Details are not described.

As shown in FIG. 18B, the STA wakes up when the AP sends a third beacon frame, and after listening to the beacon, when determining that there is no buffered data for the STA in the AP, may enter the sleep state again from the wake state after waking up for a duration t3. After the STA is in the sleep state for a duration, the STA needs to send data D6 to the AP. In this case, the STA switches from the sleep state to the wake state, the Wi-Fi chip and another wireless communications device are powered on and work, and the STA sends the data D6 to the AP. The data D6 sent by the STA carries P0, and the AP may determine, based on P0 carried in the data D6, that the STA is in the wake state. In this case, if in a third beacon period, in a process in which the STA is in the sleep state, there is buffered data for the STA in the AP, the AP may send the buffered data to the STA after receiving the data D6. Refer to the implementation shown in FIG. 18A. As shown in FIG. 18B, if there is a relatively small service volume for the STA when the STA completes transmission of the data D6, the STA may wait for a duration t7, and if determining that no other data is sent/received, the STA sends P1, and then enters the sleep state.

Figure 19A:
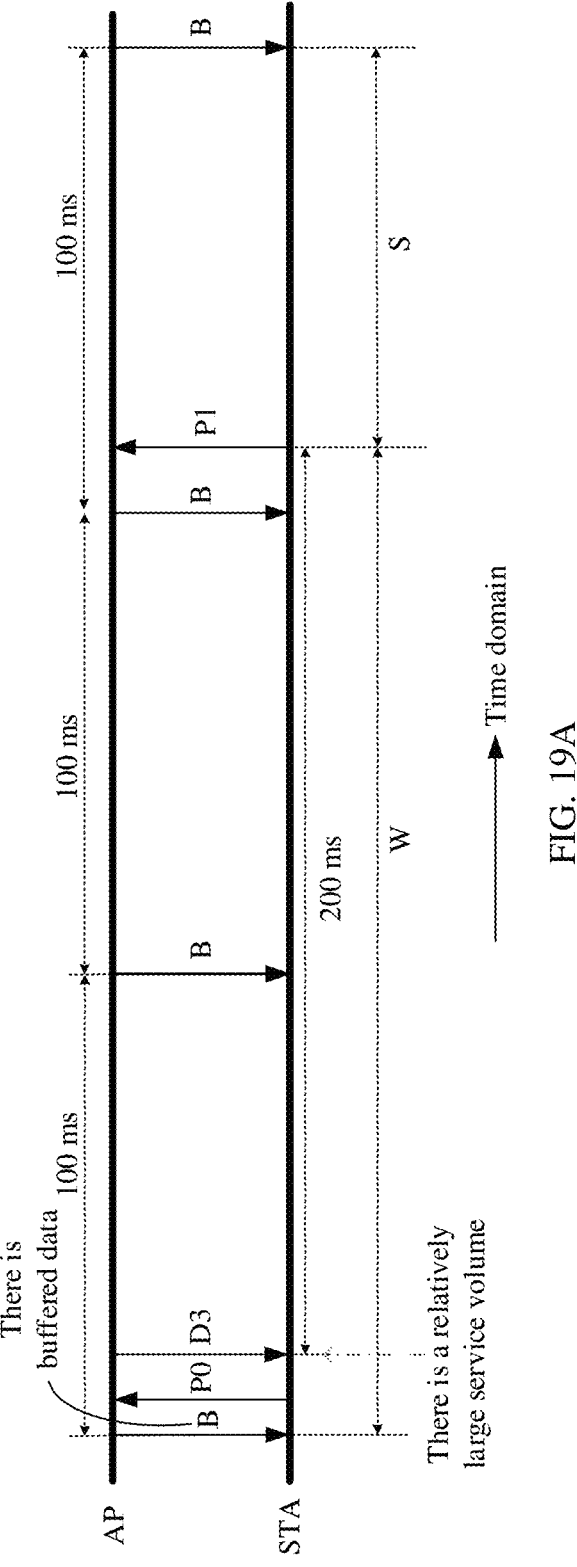
FIG. 19A is a schematic diagram of another data sending/ receiving process of an electronic device according to an embodiment of this application.

For example, FIG. 19A shows another data exchange scenario between the AP and the STA. In this scenario, the AP broadcasts the beacon frame to the outside at an interval of 100 ms.

In a first beacon period shown in FIG. 19A, the STA wakes up to perform data exchange with the AP, and receives data D3 sent by the AP. When completing receiving of the data D3, the STA enters the sleep state by using a relatively long waiting duration of 200 ms because there is a relatively large service volume for the STA. In this case, a timer may be started from a moment at which receiving of the data D3 is completed, to start timing. As shown in FIG. 19A, in a timing process that lasts for 200 ms, the STA is continuously in the wake state. In this process, the AP further sends two beacon frames to the STA. The STA is in the wake state, and therefore the STA may not listen to the two beacon frames, or may listen to the beacon frames, and then discard the beacon frames. When the timer reaches 200 ms, the STA sends P1 to the AP, and enters the sleep state. It can be understood that after the STA enters the sleep state, if the STA needs to send uplink data to the AP, the STA may wake up in the beacon period. If the AP needs to send downlink data to the STA, the AP buffers the data for the STA until the STA wakes up next time. For example, the STA wakes up when receiving a next beacon frame, or wakes up when needing to send data to the AP.

Figure 19B:
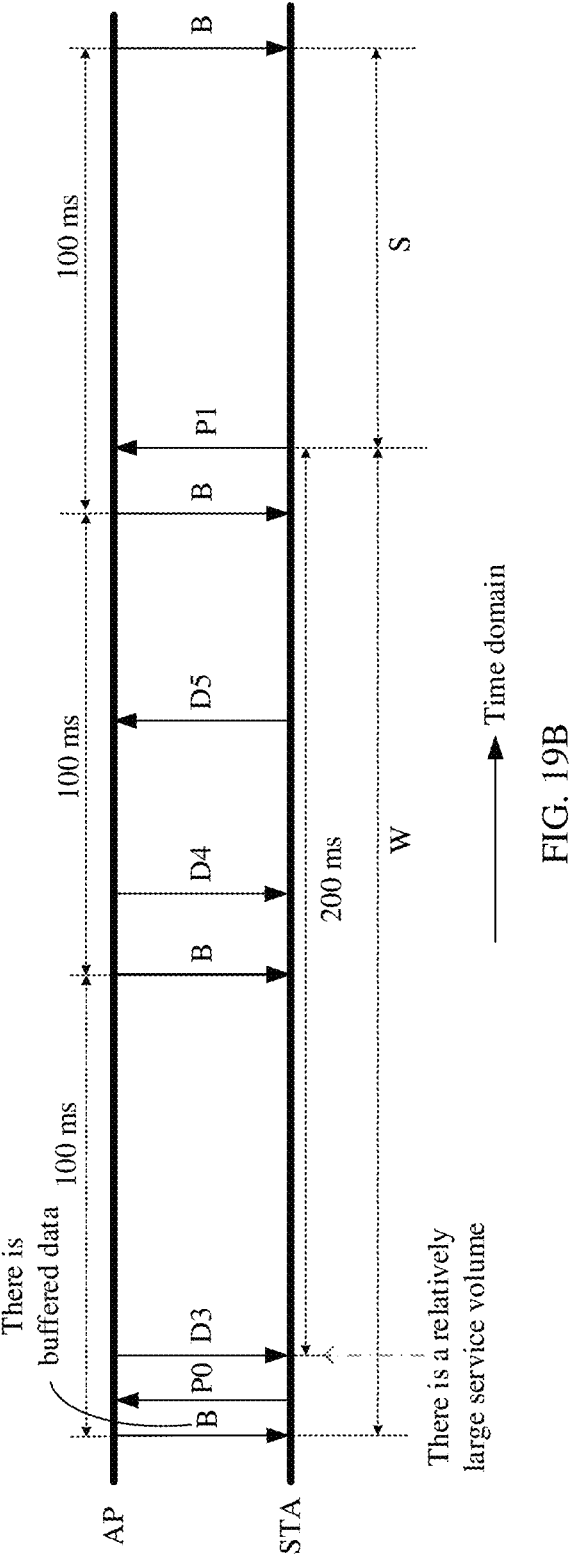
FIG. 19B is a schematic diagram of another data sending/ receiving process of an electronic device according to an embodiment of this application.

In addition, FIG. 19B shows another processing manner in this scenario. After receiving the data D3, the STA is continuously in the wake state for 200 ms. In this process, the STA has a data sending/receiving capability, that is, the STA may actively send uplink data to the AP, and may further receive data delivered by the AP. As shown in FIG. 19B, after the STA receives the data D3, a timer is started to start timing because there is a relatively large service volume. A timing duration is 200 ms. In this process, the STA receives data D4 sent by the AP, and the STA further sends data D5 to the AP. In a timing process of the timer, the STA starts timing by using a moment at which receiving of first data is completed in the wakeup state as a start point, and even if data is sent/received, does not determine the start point and an end point of the timer again, but enters the sleep state when timing reaches 200 ms. For example, when the STA receives the data D4 sent by the AP, or when the STA sends the data D5 to the AP, a waiting duration corresponding to a current communication status does not need to be determined, the timer still uses a moment at which receiving of the data D3 is completed as the start point, and when timing reaches 200 ms, the STA enters the sleep state.

In conclusion, in the technical solution provided in this embodiment of this application, the waiting duration for powering off the Wi-Fi chip is dynamically adjusted based on an actual communication scenario, including a networking status of the STA, the type of the associated SP, the type of the current application in the STA, the service volume status, the occupation status of the shared antenna, the signal strength of the STA, and the service interference status, of the STA. In this way, a quantity of opportunities and durations for powering off the Wi-Fi chip can be increased as much as possible while normal running of the service of the STA is ensured. This helps reduce power consumption of the STA and prolong a standby duration of the STA.

Figure 20:
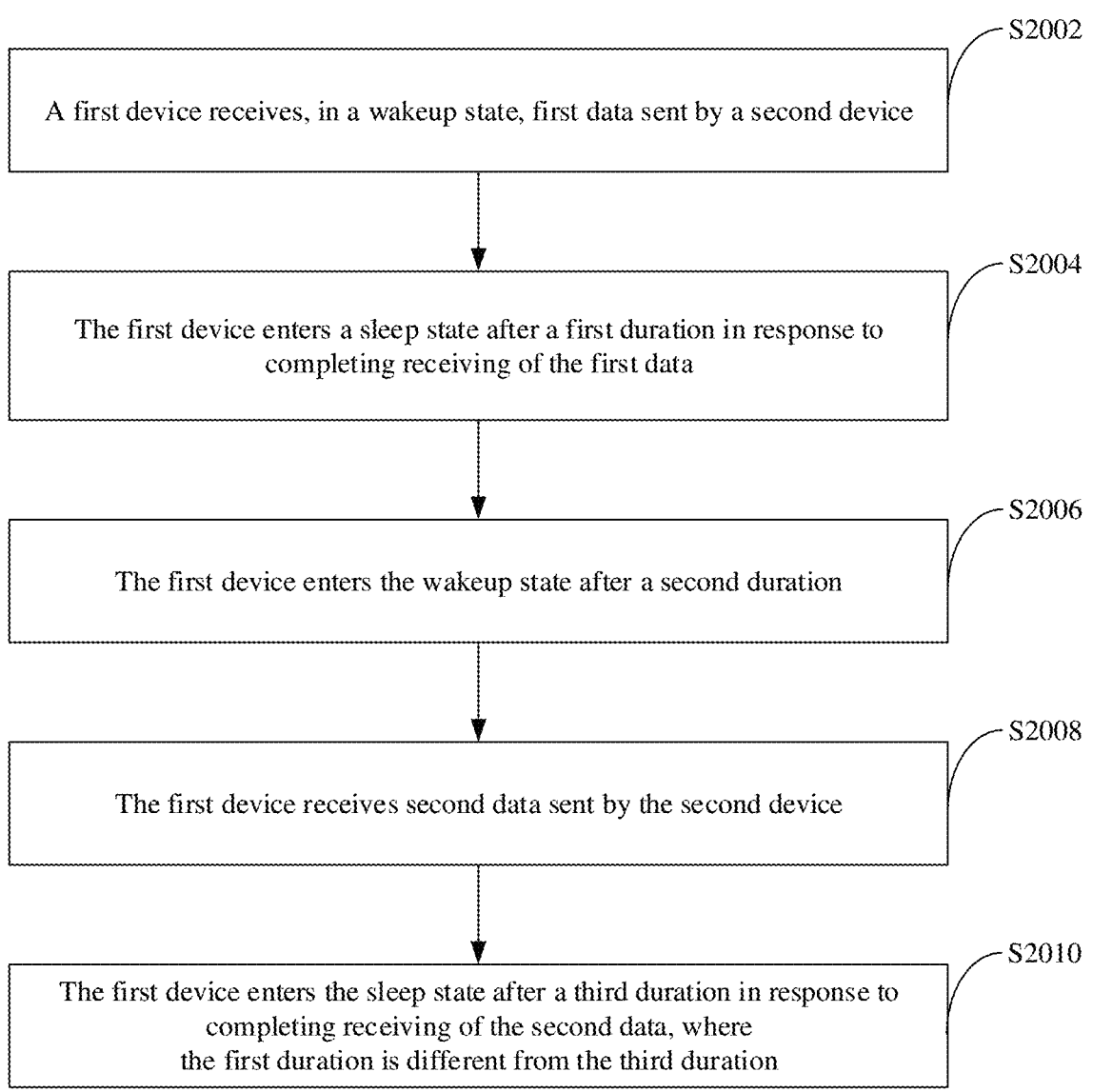
FIG. 20 is a schematic flowchart of a data sending/ receiving method according to this application.

For example, this application provides a procedure of a data sending/receiving method. Referring to FIG. 20, the method may include the following steps.

S2002. A first device receives, in a wakeup state, first data sent by a second device.

S2004. The first device enters a sleep state after a first duration in response to completing receiving of the first data.

S2006. The first device enters the wakeup state after a second duration.

S2008. The first device receives second data sent by the second device.

S2010. The first device enters the sleep state after a third duration in response to completing receiving of the second data, where the first duration is different from the third duration.

As described above, the first device may be a STA, and the second device may be an AP. The first duration and the third duration are waiting durations for entering the sleep state by the sleep state. Therefore, the first duration is associated with at least one of a service volume of the first device, signal strength, an occupation status of a shared antenna, an interference status, a type of a current application in the first device, or a type of the second device; and the second duration is associated with at least one of the service volume of the first device, the signal strength, the occupation status of the shared antenna, the interference status, the type of the current application in the first device, or the type of the second device.

The second duration may be related to a beacon frame. In different embodiments, there may be different timing start points and timing end points for the second duration.

For example, in the embodiment shown in FIG. 4A, the first duration is t2, and the third duration is t4. The first duration and the third duration vary with an application in the STA. The timing start point of the second duration is a moment at which the STA completes sending of P1, and the timing end point of the second duration is a sending moment of the beacon frame. In other words, the STA may listen to the beacon frame at the timing end point of the second duration.

For another example, in the embodiment shown in FIG. 13, the timing start point of the second duration is a moment at which the STA completes sending of P1, and the timing end point of the second duration is a moment before a sending moment of the beacon frame. There is a duration t5 between the timing end point of the second duration and the sending moment of the beacon frame. In other words, starting from the timing end point of the second duration, the STA listens to the beacon frame after the duration t5 (used as a fourth duration).

In addition, in the embodiment shown in FIG. 14, the timing start point of the second duration is a moment, in a first beacon period, at which the STA completes sending of P1, and the timing end point of the second duration is a sending moment of a third beacon frame. In this case, the second duration may further include at least one period duration of the beacon frame.

In addition, this application further provides another data sending/receiving method. Referring to FIG. 21, the method may include the following steps.

S2102. A first device sends fifth data to a second device in a wakeup state.

S2104. The first device enters a sleep state after a tenth duration in response to completing sending of the fifth data.

S2106. The first device enters the wakeup state after an eleventh duration.

S2108. The first device sends sixth data to the second device.

S2110. The first device enters the sleep state after a twelfth duration in response to completing sending of the sixth data, where the tenth duration is different from the twelfth duration.

For example, refer to FIG. 15. Details are not described. In this data sending/receiving method, a STA may determine a waiting duration in real time based on at least one of a service volume, signal strength, an occupation status of a shared antenna, an interference status, a type of a current application in the STA, or a type of an AP. It can be understood that both the tenth duration and the twelfth duration may be associated with the foregoing condition. No additional details are provided. For a part that is not described in detail, refer to the foregoing embodiment.

In addition, an embodiment of this application further provides a computer storage medium, including computer instructions. When the computer instructions are run on an electronic device, the electronic device is enabled to perform the method in any one of the foregoing implementations.

In addition, an embodiment of this application further provides a computer program product. When the computer program product runs on an electronic device, the electronic device is enabled to perform the method in any one of the foregoing implementations.

The implementations of this application may be randomly combined to achieve different technical effects.

All or some of embodiments may be implemented through software, hardware, firmware, or any combination thereof. When the software is used for implementation, all or some of embodiments may be implemented in a form of a computer program product. The computer program product includes one or more computer instructions. When the computer program instructions are loaded and executed on a computer, all or some of the procedures or functions according to this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk), or the like.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

It is clear that a person skilled in the art can make various modifications and variations to the present invention without departing from the spirit and scope of the present invention. The present invention is intended to cover these modifications and variations of the present invention provided that they fall within the scope of the claims of the present invention and their equivalent technologies.

What is claimed is:

1. A method comprising:

receiving, by a first device in a wakeup state, first data sent by a second device, wherein the first data is of a first application in a foreground of the first device;

waiting, by the first device in the wakeup state after completing receiving the first data, for a first duration;

sending, by the first device, sleep indication information after the first duration, wherein the sleep indication information indicates that the first device is to enter a sleep state, and the first duration is a duration between completing receiving the first data and entering the sleep state;

entering, by the first device, the sleep state after the first duration in response to completing receiving the first data;

entering, by the first device, the wakeup state after a second duration after the first device enters the sleep state;

receiving, by the first device in the wakeup state, second data sent by the second device, wherein the second data is of a second application in the foreground of the first device after the foreground is switched from the first application to the second application;

waiting, by the first device in the wakeup state after completing receiving the second data, for a third duration; and entering, by the first device, the sleep state after the third duration in response to completing receiving the second data, wherein the third duration is a duration between completing receiving the second data and entering the sleep state, the first duration is different from the third duration, the first duration is based on the first application, and the third duration is based on the second application.

2. The method according to claim 1, wherein a length of the first duration is further based on at least one of a service volume of the first device, signal strength, an occupation status of a shared antenna, an interference status, a delay requirement of the first application in the foreground of the first device, or a type of the second device; and a length of the second duration depends on at least one of the service volume of the first device, the signal strength, the occupation status of the shared antenna, the interference status, a delay requirement of the second application in the foreground of the first device, or the type of the second device.

3. The method according to claim 1, wherein before the first device enters the sleep state after the third duration, the method further comprises:

sending, by the first device, additional sleep indication information, wherein the additional sleep indication information indicates that the first device is to enter the sleep state.

4. The method according to claim 1, wherein when the first device is in the sleep state, a wireless transmission capability of the first device is limited.

5. The method according to claim 1, wherein when the first device is in the sleep state, downlink data of the first device is buffered by the second device.

6. The method according to claim 1, wherein a length of the second duration is related to a beacon frame, and the beacon frame is periodically broadcast by the second device.

7. The method according to claim 6, wherein the method further comprises:

listening, by the first device, to the beacon frame at a timing end point of the second duration.

8. The method according to claim 6, wherein the method further comprises:

listening, by the first device, to the beacon frame after a fourth duration after a timing end point of the second duration.

9. The method according to claim 6, wherein the second duration comprises at least one period duration of the beacon frame.

10. The method according to claim 6, further comprising:

when the first device is connected to the second device, obtaining, by the first device, a transmission period of the beacon frame.

11. The method according to claim 1, further comprising:

when the first device is in the wakeup state, listening, by the first device, to a beacon frame periodically sent by the second device, wherein the beacon frame indicates whether there is downlink data buffered for the first device in the second device.

12. The method according to claim 11, further comprising:

when the beacon frame indicates that there is downlink data buffered for the first device in the second device, sending, by the first device, wakeup indication information indicating that the first device is currently in the wakeup state.

13. The method according to claim 11, further comprising:

when the beacon frame indicates that there is no downlink data buffered for the first device in the second device, entering, by the first device, the sleep state after a fifth duration.

14. The method according to claim 1, wherein the first data is data most recently received by the first device in a current wakeup period.

15. The method according to claim 1, wherein the first data is data first received by the first device in the wakeup state in a current wakeup period.

16. The method according to claim 1, further comprising:

after the entering, by the first device, the sleep state after the third duration in response to completing receiving of the second data, entering, by the first device, the wakeup state after a sixth duration;

sending, by the first device, third data to the second device; and entering, by the first device, the sleep state after a seventh duration in response to completing sending the third data.

17. The method according to claim 1, further comprising:

after the entering, by the first device, the wakeup state after the second duration, and before the receiving, by the first device, the second data sent by the second device, sending, by the first device, fourth data to the second device;

entering, by the first device, the sleep state after an eighth duration in response to completing sending the fourth data; and entering, by the first device, the wakeup state after a ninth duration.

18. The method according to claim 1, wherein the first device is a wireless station, and the second device is a wireless access point.

19. A method comprising:

sending, by a first device in a wakeup state, first data to a second device;

waiting, by the first device in the wakeup state after completing sending of the first data, for a first duration;

sending, by the first device, sleep indication information after the first duration, wherein the sleep indication information indicates that the first device is to enter a sleep state, and the first duration is a duration between completing sending the first data and entering the sleep state;

entering, by the first device, a sleep state after the first duration in response to completing sending the first data;

entering, by the first device, the wakeup state after a second duration after the first device enters the sleep state;

sending, by the first device in the wakeup state, second data to the second device;

waiting, by the first device in the wakeup state after completing sending of the second data, for a third duration; and entering, by the first device, the sleep state after the third duration in response to completing sending the second data, wherein:

the third duration is a duration between completing sending the second data and entering the sleep state, and the first duration is different from the third duration;

a length of the first duration depends on at least one of signal strength, an occupation status of a shared antenna, an interference status, a type of a current application in a foreground of the first device, or a type of the second device; and a length of the second duration depends on at least one of the signal strength, the occupation status of the shared antenna, the interference status, the type of the current application in the foreground of the first device, or the type of the second device.

20. The method according to claim 19, further comprising:

sending, by the first device, additional sleep indication information after the third duration, wherein the additional sleep indication information indicates that the first device is to enter the sleep state.

* * * * *